US012214520B2

(12) United States Patent
Webster

(10) Patent No.: US 12,214,520 B2
(45) Date of Patent: *Feb. 4, 2025

(54) FEED ROLL ASSEMBLY, AND MOUNT AND FLUTE ELEMENT THEREFOR

(71) Applicant: Webco Mill Supply Ltd., Hope (CA)

(72) Inventor: Brian Webster, Hope (CA)

(73) Assignee: Webco Mill Supply Ltd., Hope (CA)

( * ) Notice: Subject to any disclaimer, the term of this patent is extended or adjusted under 35 U.S.C. 154(b) by 135 days.

This patent is subject to a terminal disclaimer.

(21) Appl. No.: 17/973,347

(22) Filed: Oct. 25, 2022

(65) Prior Publication Data

US 2023/0042365 A1 Feb. 9, 2023

Related U.S. Application Data

(63) Continuation-in-part of application No. 17/203,164, filed on Mar. 16, 2021, now Pat. No. 11,872,719, which is a continuation of application No. 15/486,222, filed on Apr. 12, 2017, now Pat. No. 10,974,413.

(51) Int. Cl.

| | |
|---|---|
| ***B27B 31/00*** | (2006.01) |
| ***B27B 25/02*** | (2006.01) |
| ***B27C 1/12*** | (2006.01) |
| ***B27L 1/00*** | (2006.01) |
| ***B27L 1/10*** | (2006.01) |

(52) U.S. Cl.

CPC ............ *B27B 31/003* (2013.01); *B27B 25/02* (2013.01); *B27C 1/12* (2013.01); *B27L 1/00* (2013.01); *B27L 1/10* (2013.01)

(58) Field of Classification Search

CPC .... B27L 1/00; B27L 1/025; B27L 1/04; B27L 1/045; B27L 1/05; B27L 1/08; B27L 1/10; B27B 25/02; B27B 31/003; B27C 1/12

USPC ......... 144/242.1, 246.1, 248.2, 248.3, 248.5, 144/248.6, 248.7

See application file for complete search history.

(56) References Cited

U.S. PATENT DOCUMENTS

| | | |
|---|---|---|
| 3,667,584 A | 6/1972 | Karlsson |
| 4,658,875 A | 4/1987 | Grabovac |
| 5,044,570 A | 9/1991 | Montgomery |
| 5,944,078 A | 8/1999 | Lindholm |
| 5,950,945 A | 9/1999 | Schaller |

(Continued)

FOREIGN PATENT DOCUMENTS

| | | |
|---|---|---|
| CA | 2323903 | 3/2002 |
| EP | 1186388 B1 | 8/2004 |

OTHER PUBLICATIONS

International Search Report and Written Opinion of International Patent Application Publication No. PCT/CA2018/050447 filed Apr. 11, 2018.

*Primary Examiner* — Jared O Brown

(74) *Attorney, Agent, or Firm* — Nicholas Garner; Oyen Wiggs Green & Mutala LLP

(57) ABSTRACT

An elongate mount couples an insert to a feed roll via a proximal edge thereof. The proximal edge of the elongate mount faces both outwards in part and forwards in part. The elongate mount has a recessed region that is twisted in part. The insert is shaped to be received at least in part within and matingly engage with the elongate mount via the recessed region. The elongate mount is shaped to enclose the proximal edge, spaced-apart ends and backing fact of the insert.

20 Claims, 18 Drawing Sheets

(56) References Cited

U.S. PATENT DOCUMENTS

| | | | | |
|---|---|---|---|---|
| 6,253,813 | B1 * | 7/2001 | Kube | B27B 25/02 144/250.1 |
| 6,422,277 | B1 | 7/2002 | Kube et al. | |
| 6,764,035 | B2 | 7/2004 | Denis et al. | |
| 7,350,548 | B1 | 4/2008 | Cholewczynski et al. | |
| 7,565,921 | B2 | 7/2009 | Roy | |
| 7,882,869 | B2 | 2/2011 | Kube et al. | |
| 7,938,155 | B2 | 5/2011 | Maietta et al. | |
| 8,186,611 | B1 * | 5/2012 | Boer | A01K 5/001 241/294 |
| 8,256,476 | B2 | 9/2012 | Cholewczynski et al. | |
| 10,124,509 | B2 | 11/2018 | Runquist et al. | |
| 10,974,413 | B2 | 4/2021 | Webster | |
| 2002/0062879 | A1 * | 5/2002 | Johnson | B27B 25/02 144/246.1 |
| 2003/0222164 | A1 | 12/2003 | Denis et al. | |
| 2008/0115859 | A1 | 5/2008 | Roy | |
| 2008/0298909 | A1 | 12/2008 | Gaudreault | |
| 2010/0108195 | A1 | 5/2010 | Durant et al. | |
| 2010/0154932 | A1 | 6/2010 | Cholewczynski et al. | |
| 2014/0319260 | A1 | 10/2014 | Breja | |
| 2016/0045962 | A1 | 2/2016 | Tanaka et al. | |
| 2018/0050465 | A1 * | 2/2018 | Martin | B27B 25/02 |

* cited by examiner

FEED ROLL ASSEMBLY, AND MOUNT AND FLUTE ELEMENT THEREFOR

CROSS REFERENCE TO RELATED APPLICATIONS

This application is a continuation-in-part of U.S. patent application Ser. No. 17/203,164 filed in the United States Patent and Trademark Office on 16 Mar. 2021, which is a continuation of U.S. patent application Ser. No. 15/486,222 filed in the United States Patent and Trademark Office on 12 Apr. 2017 and now granted as U.S. Pat. No. 10,974,413, the disclosures of which are incorporated herein by reference and priorities to which are claimed.

FIELD OF THE INVENTION

The present invention relates generally to powered feed rolls of the type used, for example, in feeding and discharging logs to and from the barkers.

DESCRIPTION OF THE RELATED ART

U.S. Pat. No. 6,253,813 to Kube et al. discloses a fluted feed roll. The feed roll has inner replaceable flute inserts which abut and are bolted to anchor pieces welded in place on a cylindrical roll body. Part of the inner longitudinal edge of the flute inserts bears directly against the surface of the roll body. Traction elements on the outer longitudinal edge of the flute inserts protrude radially outwardly beyond the anchor pieces.

U.S. Pat. No. 8,256,476 to Cholewczynski et al. discloses apparatuses, systems, and methods for debarking logs. The disclosed embodiments may be used for quickly and conveniently replacing contact surfaces, such as leading edges, of-swing arm assemblies. Some disclosed embodiments include a swing arm assembly having a replaceable insert that defines a leading edge for engaging logs moving along a processing line. The insert can be made of a wear resistant material for a prolonged life. A worn insert can be replaced with another insert to ensure proper functioning of the debarker.

U.S. Pat. No. 7,565,921 to Roy discloses a log feed roll for displacing a log. The log feed roll may be rotated around a rotary axis. The log feed roll includes flutes for propelling the log. The log feed roll includes removable flute attachments fastened to the flutes for contacting the log during engagement of the log in the feed roll. The flutes have flute apertures extending through side walls thereof. The attachments have a top attachment section from which generally opposed side braces extend. The attachments are fastened to the flutes by bolts extending through the brace apertures on one side brace, the flute apertures and the brace apertures on the opposing side brace, and nuts engaged on the bolts on the opposing side brace. The side walls are situated between the side braces, in abutment therewith when the attachment is fastened to the flute.

BRIEF SUMMARY OF INVENTION

There is provided, and it is an object to provide, an improved feed roll assembly disclosed herein.

There is accordingly provided a feed roll assembly according to one aspect. The assembly includes a feed roll. The assembly includes an elongate mount coupled to and extending radially outwards from the feed roll. The assembly includes an elongate mount. The elongate mount has a recessed region extending from a distal edge towards a proximal edge thereof, extending from a first face towards a second face thereof, and extending between a pair of spaced-apart ends thereof. The assembly includes an insert shaped to matingly engage with the elongate mount via the recessed region of the elongate mount.

There is also provided a feed roll assembly according to another aspect. The feed roll assembly includes a feed roll. The feed roll assembly includes an insert. The feed roll assembly includes an elongate mount that couples the insert to the feed roll. The elongate mount is shaped to enclose a proximal edge, a backing face and spaced-apart ends of an inner portion of the insert.

There is additionally provided a feed roll assembly according to a further aspect. The feed roll assembly includes a feed roll having a longitudinal axis. The feed roll assembly includes an elongate mount. The elongate mount couples to the feed roll via a proximal edge thereof. The proximal edge of the elongate mount extends about an axis that is angled relative to the longitudinal axis of the feed roll. The feed roll assembly includes an insert shaped to be received at least in part within and matingly engage with the elongate mount.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
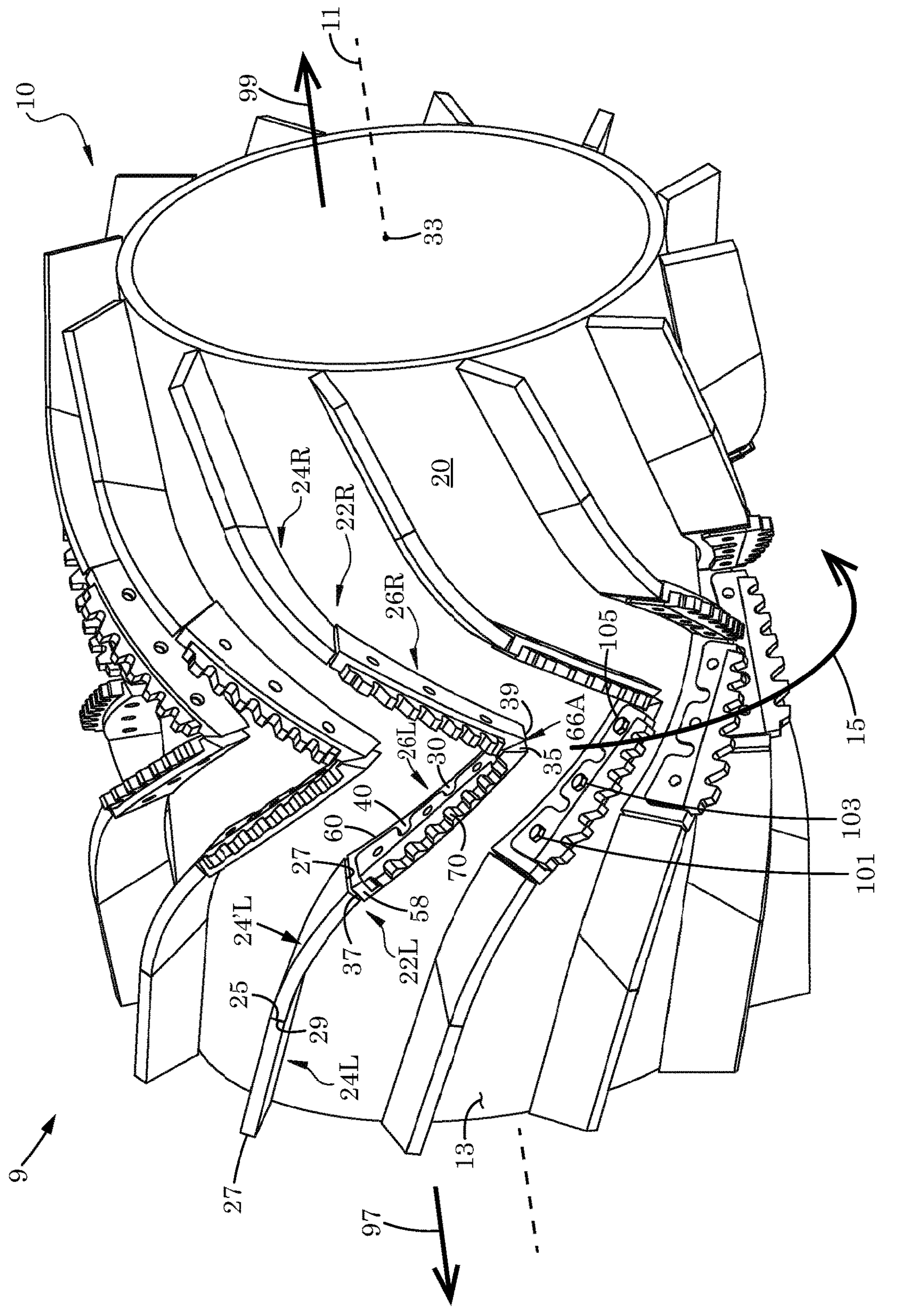
FIG. 1 is a front, first end perspective view of a feed roll assembly according to one non-limiting embodiment, the feed roll assembly including a feed roll and a plurality of flute assemblies completed thereto.

Referring to the drawings and first to FIG. 1, there is shown a feed roll assembly 9. The feed roll assembly includes a feed roll 10 according to an example embodiment. Feed roll 10 includes a body 20. The body is cylindrical in outer shape in this example. Body 20 may comprise a length of steel pipe for example, though this is not strictly required. Inside the body, and not visible in the drawings, is an annular flange provided with holes for receiving bolts to secure the flange to a driven hub. When driven, feed roll 10 rotates about its longitudinal axis 11. Body 20 has an outer surface 13 that is outwardly convex.

Feed roll assembly 9 includes left and right sets of complementing, circumferentially distributed flutes 22R-22L. The flutes each comprise fixed outer flutes 24R-24L and inner flute assemblies 26R-26L. In the illustrated example, feed roll 10 has twelve flutes in each right and left set which are equally spaced apart by 30°; however this is not strictly required.

Outer flutes 24R-24L are mirror images of one another and are positioned so that inner and outer ends are displaced with respect to one another circumferentially of the roll. This is seen in FIG. 1 by inner end 25 of outer flute 24L being displaced or circumferentially spaced from outer end 27 of outer flute 24L and by inner end 29 of outer flute 24'L being displaced or circumferentially spaced from outer end 27 of outer flute 24'L. Respective adjacent outer flutes 24L and 24L' (or flute sections) in each outer set have inner and outer ends 25 and 29 adjacent to each other. Respective flutes 24L and 24L' (or flute sections) in each outer set have their inner ends directly opposite one another and are spaced apart equally from longitudinal center 33 of body 20. Outer flutes 24R-24L are coupled to outer surface 13 of body 20 of feed roll 10 in this example via welding.

Inner flute assemblies 26R-26L are longitudinally between outer flutes 24R-24L, and are positioned so that their inner ends 35 and outer ends 37 are displaced with respect to one another circumferentially of fee roll 10. Respective adjacent inner flute assemblies 26L and 26R in each outer set have inner ends 35 and 39 adjacent to each other. Respective inner flute assemblies in each set have their inner ends directly opposite one another and are spaced apart equally from longitudinal center 33 of body 20. Adjacent inner flute assemblies 26L and 26R are arranged to form a V-shaped in front profile in this example.

Figure 7:
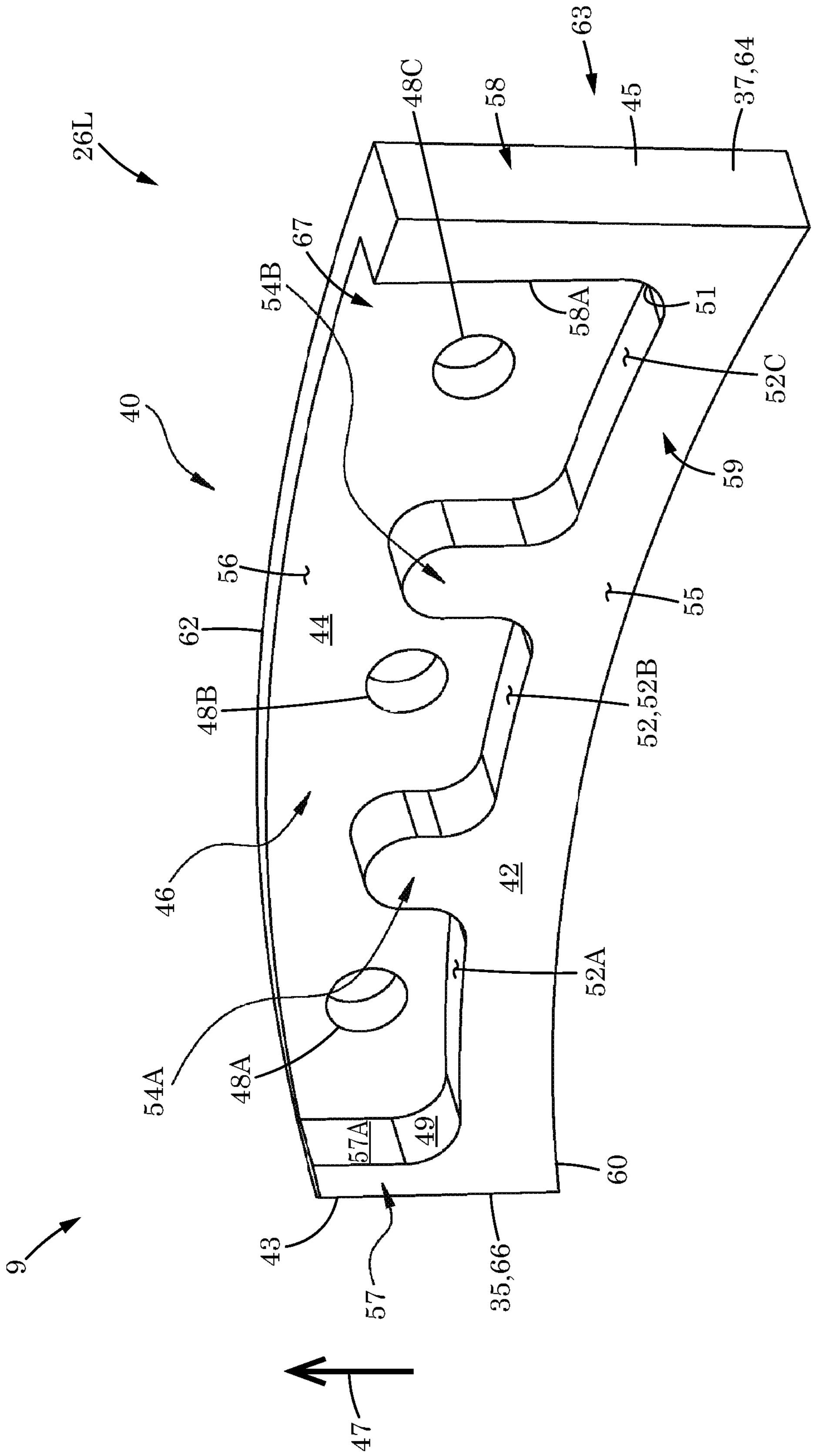
FIG. 7 is a front, first end perspective view of the mount of FIG. 2.

As seen in FIG. 7, each inner flute assembly 26L includes an elongate mount 40. The mount includes a base portion 42 and a backing portion 44, located outward of base portion 42, that together define a seat 46. The base portion is generally an arcuate-shaped rectangular prism in shape in this example. Base portion 42 has an outer face 52. The outer face of the base portion of mount 40 is radially outwardly facing relative to feed roll 10 seen in FIG. 1. Referring back to FIG. 7, outer face 52 includes in this non-limiting embodiment a plurality of spaced-apart longitudinally face portions 52A, 52B and 52C separated by lugs 54A and 54B; however, neither face portions nor lugs are strictly required. The face portions are substantially planar and rectangular in shape in this example.

Figure 6:
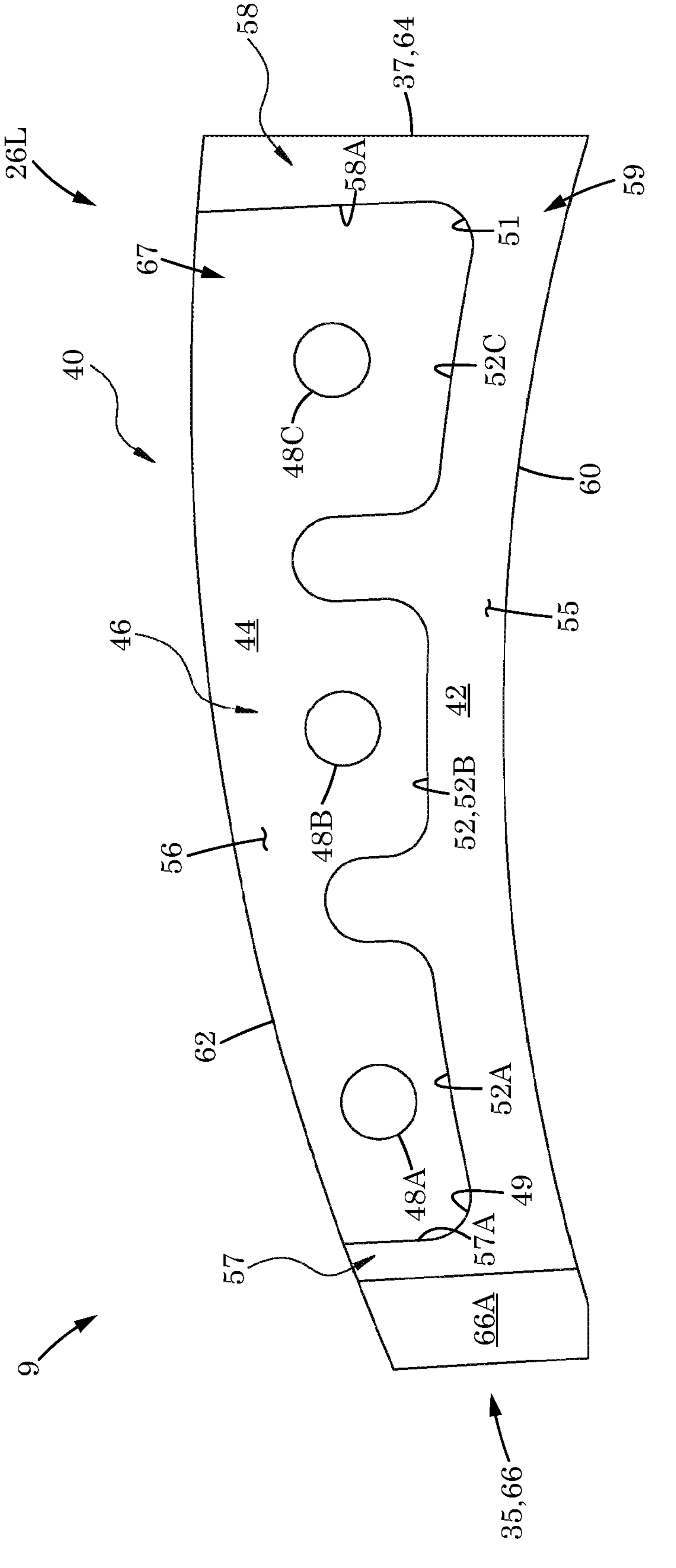
FIG. 6 is a front elevation view of the mount of FIG. 2.

As seen in FIG. 6, base portion 42 of mount 40 has a first or forward face 55. The forward face of the backing portion of the mount extends along forward side 59 of inner flute assembly 26L in this example. Forward face 55 of base portion 42 of mount 40 extends radially from and is in this example perpendicular to outer face 52 of the mount in this example; however, the latter is not strictly required. As seen in FIG. 6, the forward face of the base portion of the mount is planar and arc-shaped or a curved rectangle in shape in this example.

Backing portion 44 of mount 40 is generally an arcuate-shaped planar rectangular prism in shape in this example. The backing portion of the mount includes a mounting face 56. The forward face of backing portion 44 of mount 40 is planar and outwardly concave in this example. The mounting face is planar in this example. Mounting face 56 of backing portion 44 of mount 40 extends substantially perpendicular to outer face 52 of base portion 42 of the mount in this example, though this is not strictly required. In the illustrated embodiment, the outer face of the base portion thus meets the mounting face of the backing portion at a 90° degree angle. However this is not strictly required and in other embodiments this angle between outer face 52 and mounting face 56 may be less than 90 degrees. The mounting face is forward facing in this example in a circumferential direction as reference to feed roll 10 seen in FIG. 1. Referring back to FIG. 7, in this non-limiting embodiment outer face portions 52A, 52B and 52C of base portion 42 of mount 40 together with lugs 54A and 54B and adjoining mounting face 56 of backing portion 44 define seat 46.

As seen in FIG. 7, mount 40 has a pair of spaced-apart ends 43 and 45 between which extends base portion 42 and backing portion 44 thereof. The mount includes spaced-apart first and second end portions or inner and outer stops 57 and 58. The inner stop extends from end 43 towards end 45 of mount 40. Outer stop 58 extends from end 45 towards end 43 of the mount. The stops extends substantially outwards in a first or radial direction (relative to feed roll 10 seen in FIG. 1) in this example as seen by arrow 47 in FIG. 7. Outer stop 58 is generally a rectangular prism in shape in this example that is vertically extending relative to FIG. 7. As seen in FIG. 7, inner stop 57 is generally a trapezoidal prism in shape in this example relative to FIG. 8. As seen in FIG. 1, outer stop 58 is substantially the same width and depth as inner end 27 of adjacent outer flute element 24L in this example. Outer stop 58 may be joined to the inner end of outer flute element 24L, such as by welding, for example. Referring back to FIG. 7, inner stop 57 and outer stop 58 both further define seat 46.

As seen in FIG. 7, the inner and outer stops of mount 40 include a pair of spaced-apart interior end faces 57A and 58A. The interior end faces extend radially outwards relative to feed roll 10 seen in FIG. 1. Interior end faces 57A and 58A of stops 57 and 58 of mount 40 are generally rectangular and planar in this example. The interior end faces couple to and extend outwards from mounting face 56 of backing portion 44 of the mount. The interior end faces of stops 57 and 58 extend perpendicular to the mounting face 56 of the backing portion of mount 40 in this example. As seen in FIG. 6, interior end faces 57A and 57B extend radially outwards (relative to feed roll 10 seen in FIG. 1) and perpendicular to outer face 52 of base portion 42 of mount 40 in this example. The interior end faces of the stops are in fluid communication with the outer face of the base portion of mount 40. Interior end faces 57A and 58A of stops 57 and 58 are in fluid communication with mounting face 56 of backing portion 44 of the mount.

As seen in FIG. 7, mount 40 includes a pair of spaced-apart shoulders, in this example inner shoulders, in this case rounded shoulders 49 and 51. Each shoulder is outwardly concave in shape. Shoulder 49 extends between and is contiguous with interior end face 57A and face portion 52A in this example. Shoulder 51 extends between and is contiguous with interior end face 58A and face portion 52C. The shoulders are in fluid communication with outer face 52 of base portion 42 of mount 40 and are in fluid communication with mounting face 56 of backing portion 44 of the mount in this example.

As seen in FIG. 6, backing portion 44 of mount 40 has at least one and in this example a plurality of longitudinally spaced-apart apertures, in this example boreholes 48A, 48B and 48C extending therethrough; however, there may be one, two or four or more boreholes in other embodiments. The boreholes are substantially equally spaced-apart in this example, though this is not strictly required. Boreholes 48A, 48B and 48C are defined through backing portion 44 of mount 40. The boreholes are positioned between inner stop 57 and outer stop 58 of the mount. In some embodiments only a single borehole is provided through backing portion 44 of mount 40.

Still referring to FIG. 6, mount 40 has a first, inner or proximal edge 60. The proximal edge of mount 40 is arcuate and outwardly concave in this example in forward side and top profile in this example. Proximal edge 60 of mount 40 is spaced apart from and radially inward of seat 46 relative to feed roll 10 seen in FIG. 1. Referring back to FIG. 6, the proximal edge of the mount extends between ends 35 and 37 and stops 57 and 58 of the mount. Proximal edge 60 of the mount is spaced apart from and generally opposite outer face 52 of base portion 42. Forward face 55 of base portion 42 of mount 40 extends between proximal edge 60 of the mount and outer face 52 of the base portion of the mount in this example.

As seen in FIG. 1, proximal edge 60 abuts outer surface 13 of body 20 of feed roll 10. The arcuate configuration of the proximal edge provides for close contact between base portion 42 of mount 40 and the outer surface of the body of the feed roll. The arcuate configuration of proximal edge 60 also facilitates affixation, such as by welding, of mount 40 onto outer surface 13 of body 20 of feed roll 10. In some embodiments, proximal edge of the mount includes a compound curve, which may facilitate continuous butting contact between the base portion of mount 40 and the outer surface of the body of the feed roll. The mount couples to and extends radially outwards from outer surface 13 of body 20 of feed roll 10 via proximal edge 60 thereof.

As seen in FIG. 6, mount 40 has a second, outer or distal edge 62 spaced-apart from the proximal edge thereof. Interior end faces 57A and 58A of stops 57 and 58 extend from distal edge 62 towards proximal edge 60 of mount 40. Base portion 42 of the mount extends between ends 35 and 37 of the mount and extends from proximal edge 60 towards the distal edge of the mount. Backing portion 44 of mount 40 extends between stops 57 and 58 and extends from distal edge 62 towards proximal edge 60 of the mount. The distal edge of the mount extends about axis parallel to that of proximal edge 60 of the mount in this example; however, this is not strictly required. Distal edge 62 of mount 40 extends between ends 35 and 37 of the mount. The distal edge of the mount is outwardly convex in forward side profile in this example. Proximal edge 60 of mount 40 has a more inwardly located center and smaller radius than distal edge 62 of the mount in this example. As a result, the mount tapers from outer end 64 to inner end 66 thereof. The outer and inner ends of mount 40 correspond to outer end 37 and inner end 35 of inner flute assembly 26L. As can be seen in FIG. 6, outer end 64 of mount 40 is wider ("higher" in FIG. 1) than inner end 66 of the mount.

As best seen in FIG. 1, the inner end of the mount is beveled in this non-limiting embodiment to provide an inner edge 66A. The beveled inner edge is relatively more closely aligned with the direction of rotation 15 of feed roll 10 as compared with an edge perpendicular to the major axis of mount 40. In the illustrated embodiment, the beveled inner edge 66A is generally parallel to the cross-section of body 20 (i.e., generally orthogonal to the rotary axis of feed roll 10), such that facing inner edges of complementing mounts are parallel to one another. This configuration facilitates a welded connection between the facing inner edges of complementing mounts on feed roll 10.

Figure 8:
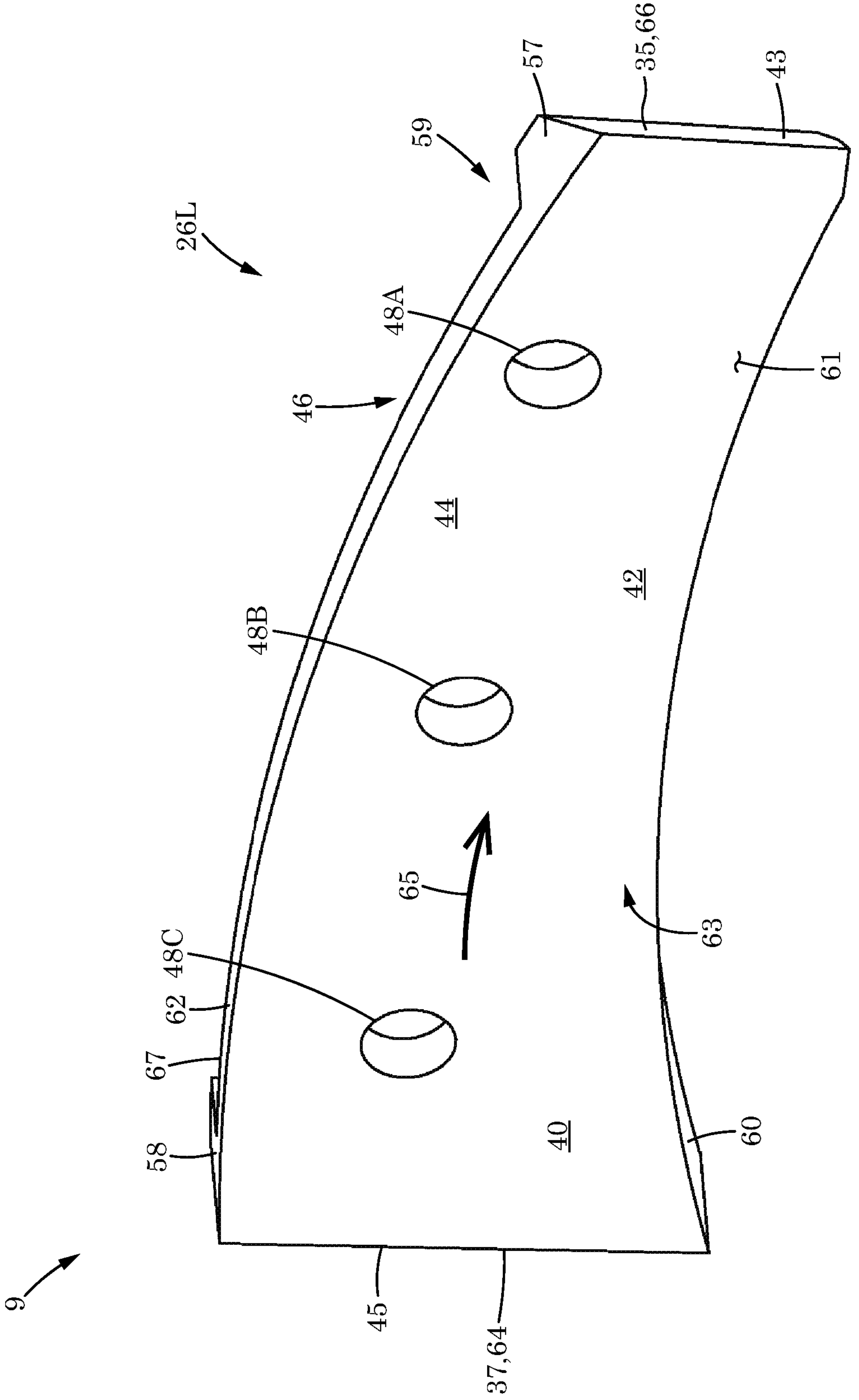
FIG. 8 is a rear, second end perspective view of the mount of FIG. 2.

As seen in FIG. 8, mount 40 has a second or rearward face 61. The rearward face of the mount extends along rearward side 63 of inner flute assembly 26L in this example. The rearward face is opposite forward face 55 of base portion 42 of the mount seen in FIG. 2. Referring back to FIG. 8, rearward face 61 of mount 40 extends radially outwards from and is in this example perpendicular to proximal edge 60 and distal edge 62 of the mount in this example; however, the latter is not strictly required. The rearward face of the mount is arc-shaped or a curved rectangle in shape in this example. Rearward face 61 of mount 40 extends between ends 43 and 45 and tapers in a direction 65 extending from end 45 of the mount towards end 43 of the mount in this example. The rearward face extend.

As seen in FIG. 7, mount 40 has a recessed region 67. The recessed region extends from distal edge 62 of the mount towards proximal edge 60 of the mount. Recessed region 67 of mount 40 extends from forward face 55 of the mount towards rearward face 61 of the mount seen in FIG. 8. Referring back to FIG. 7, the recessed region of the mount extends between spaced-apart ends 64 and 66 of the mount. Interior end faces 57A and 58A of mount 40 are in fluid communication with recessed region 67 of mount 40.

Figure 2:
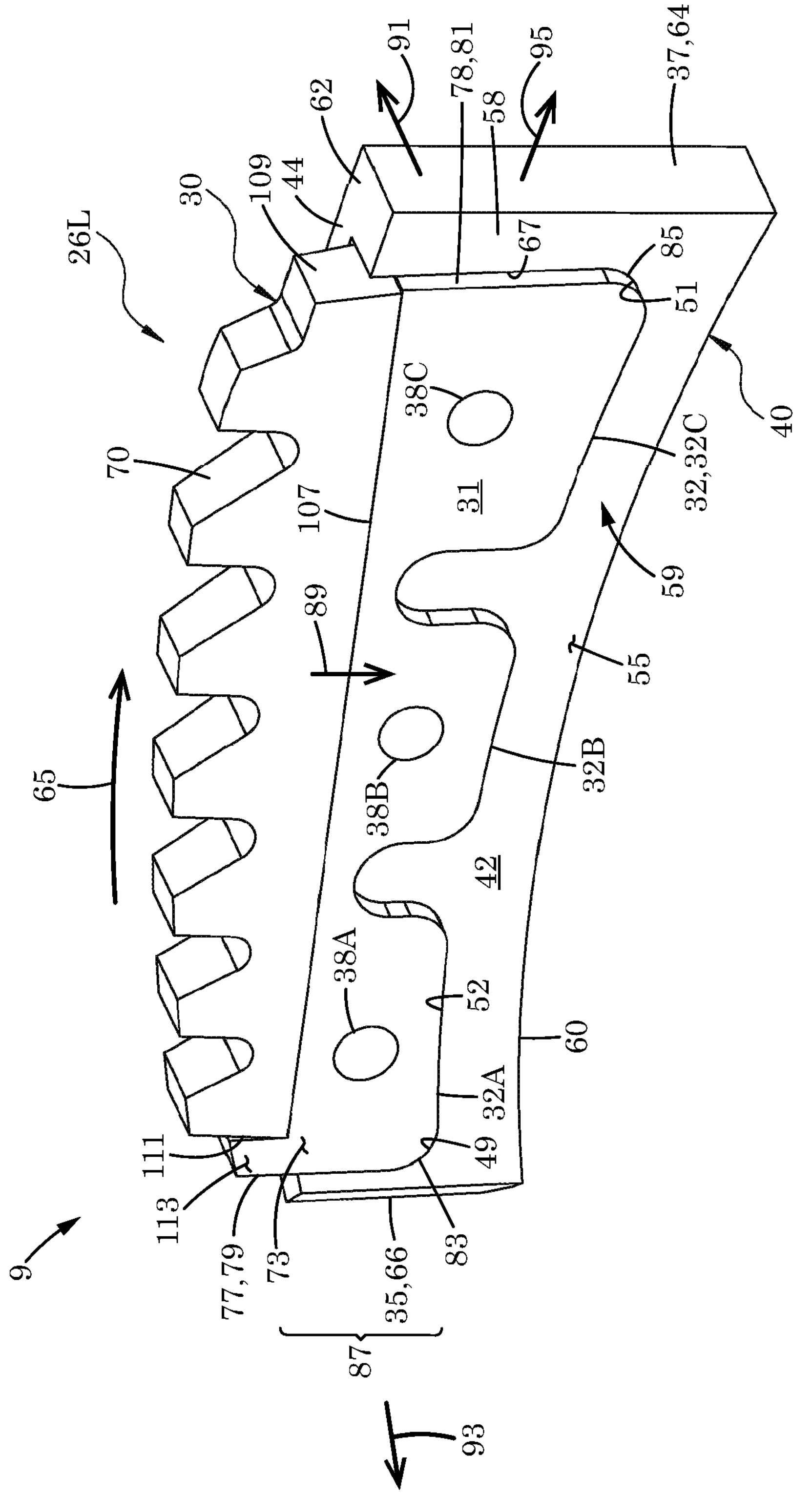
FIG. 2 is a front, first end perspective view of one of the flute assemblies of FIG. 1, the flute assembly includes a mount and flute element coupled to and partially received within the mount thereof.

As seen in FIG. 2, each inner flute assembly 26L includes an insert, in this example flute element 30. The flute element may be referred to as a flute insert element and/or may be referred to as a flute. Flute element 30 is seated in mount 40. The flute element is shaped to matingly engage with the mount via recessed region 67 of the mount.

Figure 3:
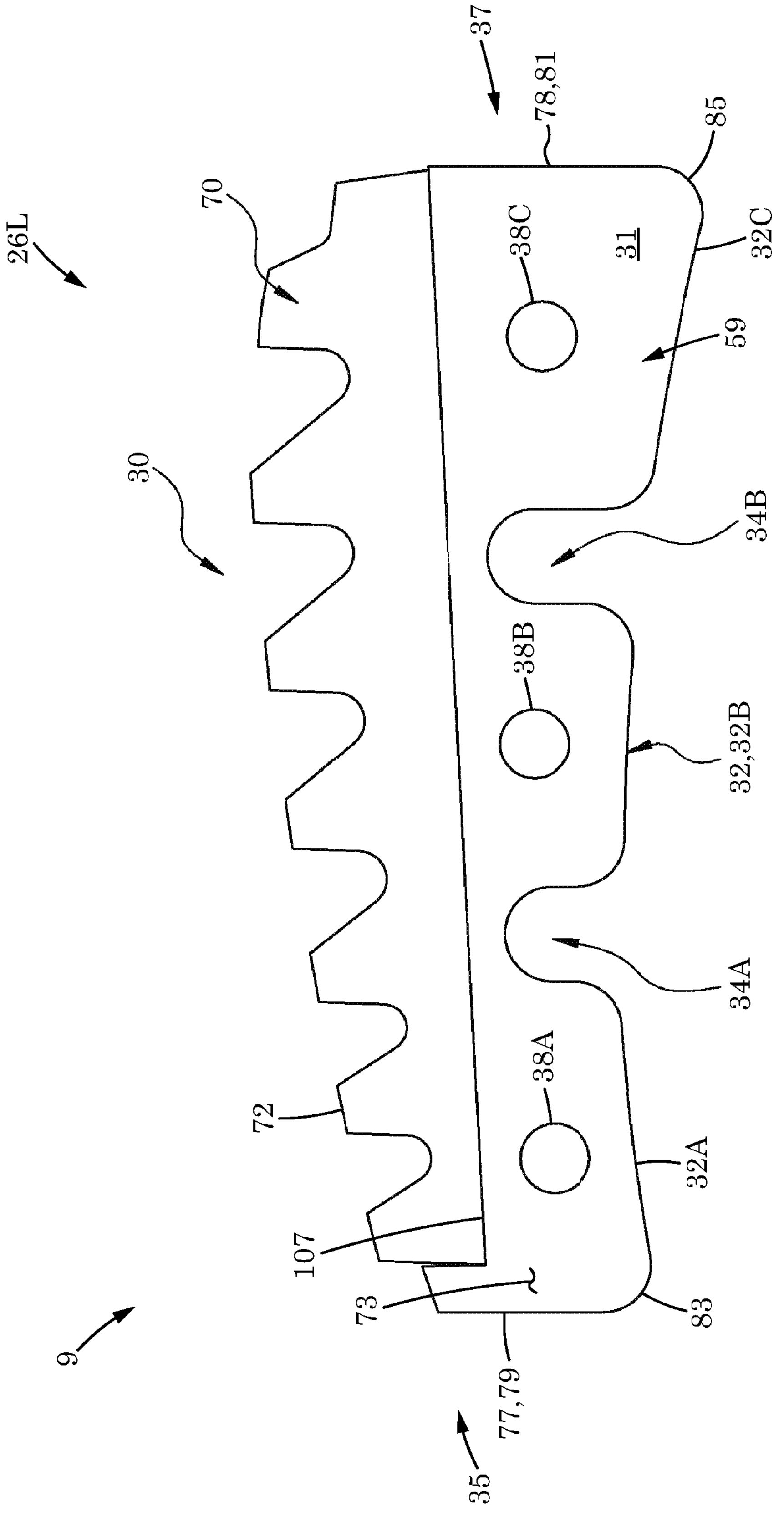
FIG. 3 is a front elevation view of the flute element of FIG. 2.

Flute element 30 includes an elongated plate body 31 that is shaped for mating engagement with seat 46 of mount 40. As seen in FIG. 3, the plate body includes an inner face 32, which includes in this non-limiting example three longitudinally spaced-apart face portions 32A, 32B and 32C. The face portions are separated by recesses 34A and 34B which are radially outwardly extending relative to feed roll 10 seen in FIG. 1. Inner face 32, or face portions 32A, 32B and 32C thereof, of flute element 30 may be referred to as a first, inner or proximal edge of the flute element. The inner face of the flute element is outwardly concave in this example. Inner face 32 of flute element 30 is complementary to outer face 52 of mount 40 seen in FIG. 7. In this example, the curvature of the inner face of the flute element seen in FIG. 3 matches the curvature of outer face 52 of mount 40 seen in FIG. 6. Inner face 32 of flute element 30 is thus shaped to at least in part abut and extend along mount 40. Referring to FIG. 3, in this non-limiting embodiment recesses 34A and 34B of flute element 30 are formed on inner face 32 to receive lugs 54A and 54B of mount 40 seen in FIG. 7.

Figure 4:
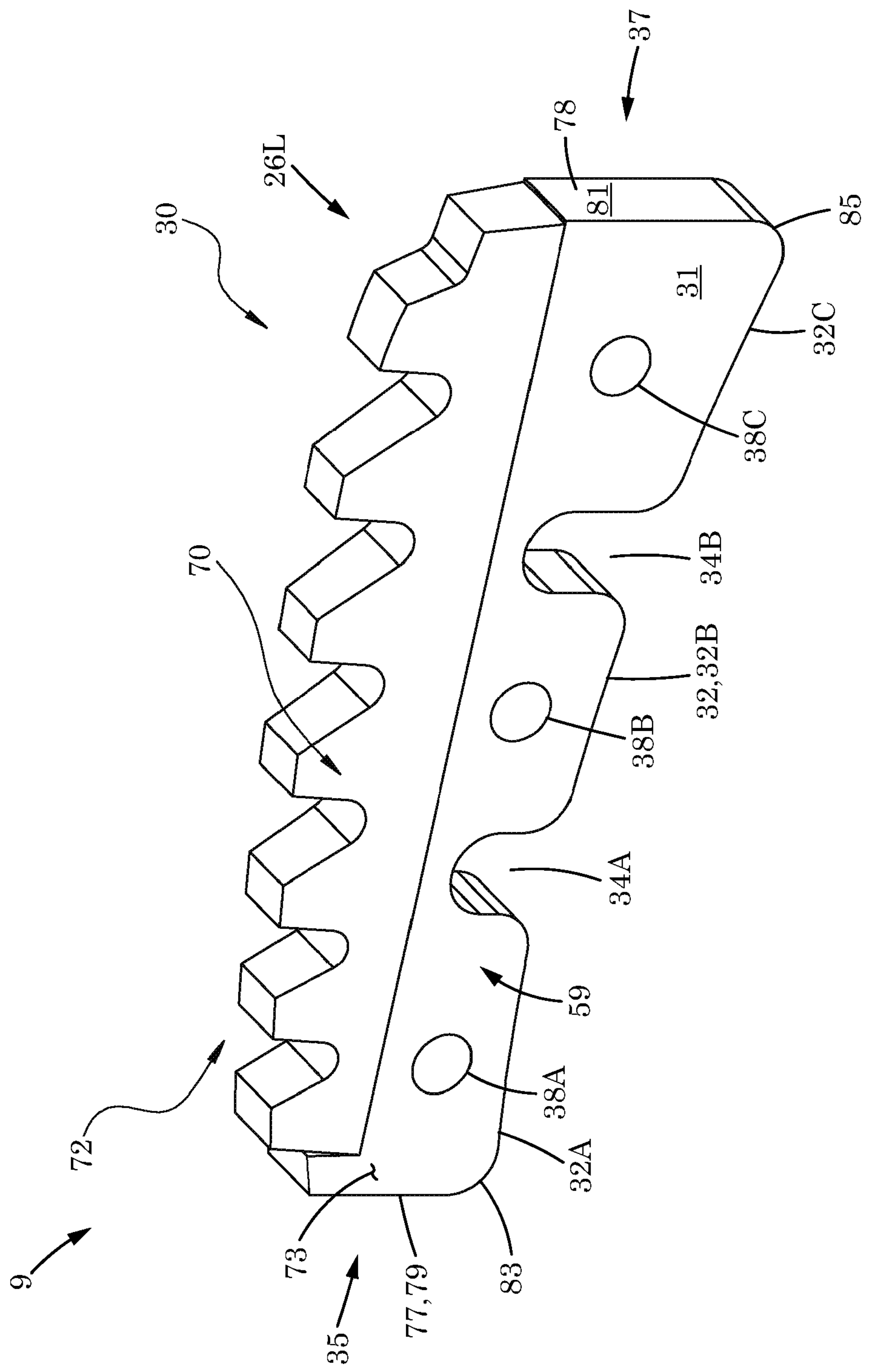
FIG. 4 is a front, first end perspective view of the flute element of FIG. 2.
Figure 5:
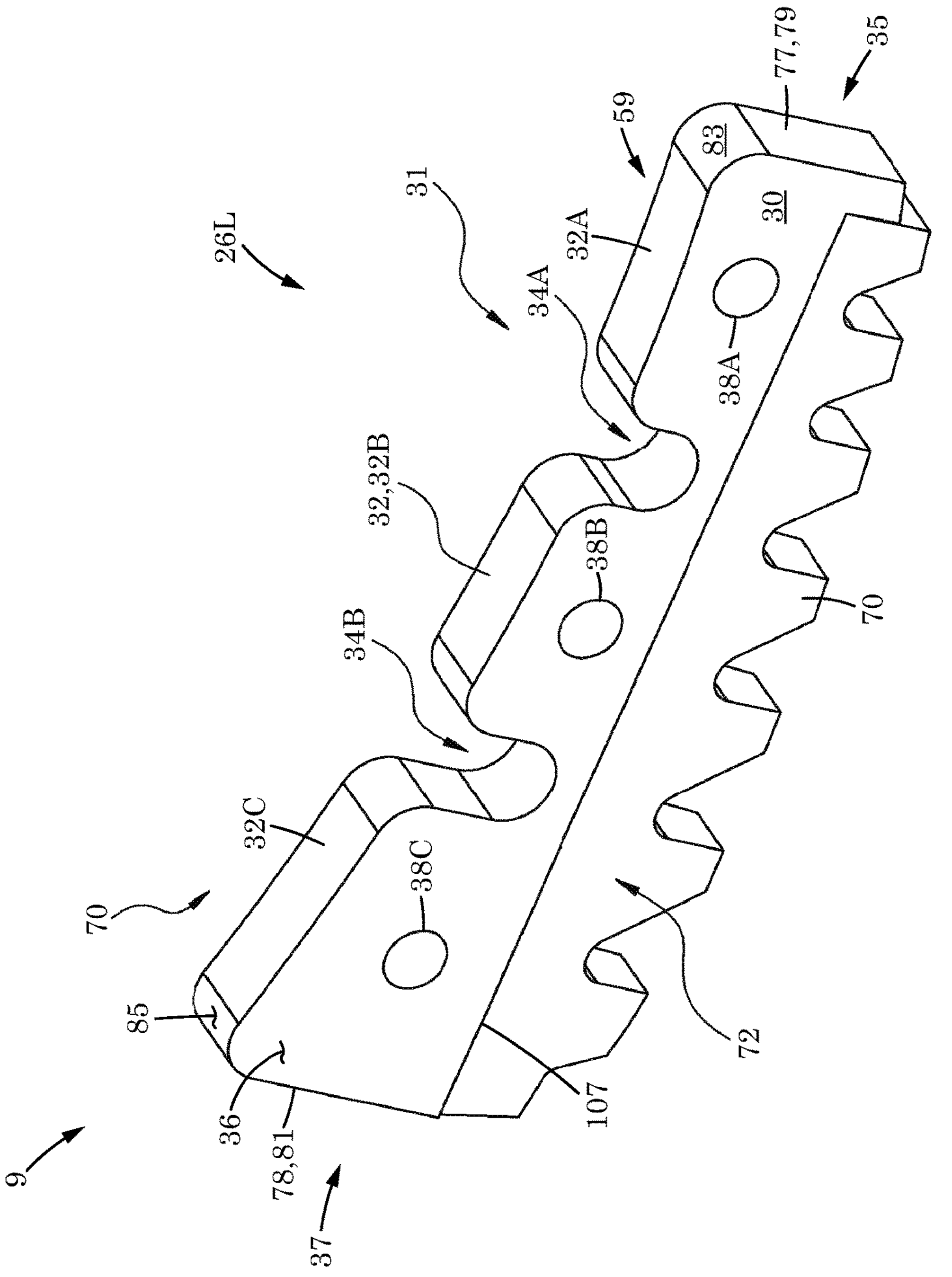
FIG. 5 is a rear, second end perspective view of the flute element of FIG. 2.

As seen in FIG. 5, flute element 30 has a first, rearward or backing face 36 that extends outwardly from inner face 32. The backing face of the flute element is complementary to mounting face 56 of mount 40 seen in FIG. 7. In this example, backing face 36 of flute element 30 seen in FIG. 5 is coplanar with the mounting face of the mount seen in FIG. 7. As seen in FIG. 5, inner face 32 and backing face 36 of flute element 30 form an angle that is complementary to the angle formed between outer face 52 and mounting face 56 of mount 40 seen in FIG. 7 that define seat 46. Referring back to FIG. 5, backing face of the flute element extends perpendicular to the inner face of the flute element in this example; however, this is not strictly required. The described non-limiting configuration provides for mating engagement of flute element 30 seen in FIG. 4 with seat 46 of the mount seen in FIG. 7 wherein inner face 32 abuts outer face 52 and backing face 34 abuts mounting face 56. The flute element so matingly engaged with mount 40 is seen in FIG. 2.

As seen in FIG. 4, plate body 31 of flute element 30 has a second or forward face 73. The forward face of the plate body of the flute element extends along forward side 59 of inner flute assembly 26L in this example. Forward face 73 of plate body 31 of flute element 30 extends radially from and is in this example perpendicular to inner face 32 of the flute element in this example; however, the latter is not strictly required. The forward face of the plate body of the flute element is generally planar and arc-shaped or a curved rectangle in shape in this example. Forward face 73 of plate body 31 of flute element 30 is opposite backing face 36 of the plate body of the flute element seen in FIG. 5.

Referring back to FIG. 3, the plate body of the flute element has at least one and in this example a plurality of longitudinally spaced-apart boreholes 38A, 38B and 38C extending therethrough; however, there may be one, two or four or more boreholes in other embodiments. The boreholes are substantially equally spaced-apart in this example, though this is not strictly required. Boreholes 38A, 38B and 38C are defined through plate body 31 of flute element 30. The boreholes are positioned between ends 77 and 78 of the flute element. In some embodiments only a single borehole is provided through plate body 31 of flute element 30. Boreholes 38A, 38B and 38C of the flute element are positioned to align with boreholes 48A, 48B and 48C of mount 40 seen in FIG. 6. The boreholes of flute element 30 seen in FIG. 3 may be but need not necessarily be coaxial with respective boreholes of the mount seen in FIG. 6.

As seen in FIG. 4, plate body 31 of flute element 30 has an inner end 77 and outer end 78 spaced-apart from the inner end thereof. The flute element has a pair of spaced-apart distal end faces 79 and 81 extending along and adjacent respective ends 77 and 78 thereof. The end faces of flute element 30 extend perpendicular to inner face 32 of the flute element in this example; however, this is not strictly required. Inner face 32 and forward face 73 of the flute element extend between ends 77 and 78 and end faces 79 and 81 of the flute element. As seen in FIG. 5, backing face 36 of flute element 30 extends between the ends and end faces of the flute element.

Referring to FIG. 4, flute element 30 has a pair of spaced-apart shoulders, in this example outer shoulder, in this case rounded corners 83 and 85. The corners are outwardly convex. Rounded corner 83 of flute element 30 extends between inner face 32 and face portion 32A of the flute element and respective end 77 and end face 79 of the flute element in this example. Rounded corner 85 of the flute element extends between the inner face and face portion 32C of the flute element and respective end 78 and end face 81 of the flute element in this example.

End 77 and end face 79 of flute element 30 are shaped to extend along and abut corresponding interior end faces inner stop 57 and interior end face 57A of mount 40 seen in FIG. 7 when the flute element is matingly engaged with seat 46 of the mount as seen in FIG. 2. Referring back to FIG. 4, outer end 78 and end face 81 of plate body 31 of flute element 30 are shaped to extend along and abut outer stop 58 and interior end face 58A of the mount seen in FIG. 7 when the flute element is matingly engaged with the seat of the mount as seen in FIG. 2. Referring back to FIG. 4, round corners 83 and 85 of the flute element are shaped to matingly engage with rounded shoulders 49 and 51 of mount 40 seen in FIG. 2.

As seen in FIG. 2, recessed region 67 of mount 40 is spaced to receive an inner portion 87 of flute element 30. Referring to FIGS. 2 and 5, the mount is shaped to enclose inner face 32, backing face 36 and spaced-apart ends 77/78 and end faces 79/81 of the inner portion of the flute element. As seen in FIG. 2, mount 40 is thus shaped to enclose the inner face and spaced-apart ends/end-faces of flute element 30. The flute element is thus shaped to be received at least in part within and matingly engage with the mount in this example via recessed region 67 seen in FIG. 2.

Still referring to FIG. 2, the mating engagement of flute element 30 in seat 46 of mount 40 constrains the movement of flute element 30 in three orthogonal directions. In particular, base portion 42 of the mount inhibits travel of flute element 30 in a radially inward direction 89. Backing portion 44 of the mount inhibits travel of flute element 30 in direction 91 opposite direction of rotation 15 of feed roll 10 seen in FIG. 1. Stops 57 and 58 inhibit travel of flute element 30 in directions 93 and 95 at least partially parallel to longitudinal axis 11 of feed roll 10 seen in FIG. 1 and/or inhibit travel of the flute element in directions 97 and 99 parallel to the longitudinal axis of feed roll 10 seen in FIG. 1. As seen in FIG. 2, in this non-limiting embodiment the mating engagement of lugs 54A and 54B of mount 40 in recesses 34A and 34B of flute element 30 provides additional constraint on the movement of flute element 30 relative to mount 40; however, lugs and recesses are not strictly required.

The butting of inner face 32 of the flute element against outer face 52 of the mount, which is provided by the mating engagement of the flute element in seat 46 of the mount, provides a connection for transmitting radially-directed forces acting on the flute element though the mount to body 20 of feed roll 10 seen in FIG. 1. Registration of boreholes 48A, 48B and 48C through mount 40 seen in FIG. 6 with corresponding boreholes 38A, 38B and 38C through flute element 30 seen in FIG. 3 is not affected by variations in the relative spatial arrangement of mount 40 and body 20 of feed roll 10 seen in FIG. 1. As a result, there is no need to oversize the boreholes defined in the mount or flute element in order to both assure registration of boreholes 48A, 48B and 48C seen in FIG. 6 with boreholes 38A, 38B and 38C seen in FIG. 3 and provide force transmission from the flute element to the body of the feed roll seen in FIG. 1.

Each inner flute assembly includes one or more fasteners, in this example bolts to detachably couple the flute element thereof to the mount thereof: this is seen by way of example only in FIG. 1 by bolts 101, 103 and 105 extending through boreholes 48A, 48B and 48C of mount 40 seen in FIG. 6 and boreholes 38A, 38B and 38C of flute element 30 seen in FIG. 3. Referring to FIGS. 3 and 6, threads (not shown) may be provided in boreholes 38A, 38B, 38C, 48A, 48B and 48C, and the threads formed in corresponding boreholes (i.e., those that are registered when flute element 30 is matingly engaged with mount 40) may be continuous. Alternatively, the threads in corresponding boreholes may be matched so that even if the thread is not continuous a single threaded bolt will mate in the registered boreholes of flute element 30 and mount 40 when flute element 30 is matingly engaged with seat 46 of mount 40. In some embodiment, threads are provided only in boreholes 48A, 48B, and 48C. Mount 40 thus selectively couples flute element 30 to feed roll 10 seen in FIG. 1.

As seen in FIG. 3, flute element 30 has an outer face 107 radially spaced from inner face 32 thereof. The outer face of the flute element is planar and rectangular in this example; however, this is not strictly required. Forward face 73 of flute element 30 seen in FIG. 3 and backing face 36 of the flute element seen in FIG. 5 extend between inner face 32 of the flute element and outer face 107 of the flute element.

As seen in FIG. 2, inner flute assembly 26L includes at least one and in this example a plurality of longitudinally spaced-apart gripping or traction members, in this non-limiting embodiment in the form of serrated teeth 70. The teeth couple to and may thus be considered part of the flute element in this example. Teeth 70 are provided along a second, outer or distal edge 72 of flute element 30. The distal edge (or series of longitudinally spaced-apart edges or edge portions) are arcuate and outwardly convex in this example.

Teeth 70, which may have their leading and trailing edges beveled, provide traction against logs (not shown) fed into feed roll 10 seen in FIG. 1. Referring to FIG. 2, the teeth are preferably progressively larger in depth and width from the inner end of 77 of each flute element to the wider outer end 78. In the illustrated embodiment, teeth 70 comprise high chromium steel, and are joined to plate body 31 by thermal brazing. Teeth 70 couple to and extend outwards from outer face 107 of flute element 30 in this example; however, this is not strictly required. Teeth 70 have a first end 109 and a second end 111 spaced-apart from the first end thereof. The first end of the teeth aligns with and abuts stop 58 of mount 40 in this example. A protrusion or stop 113 extends radially outwards from outer face 107 of flute element 30 so as to abut against second end 111 of the teeth; however, stop 113 is not strictly required and the second end of the teeth may be supported by mount 40 in other manners in other embodiments. As seen in FIG. 2, flute element 30 in this example are made sufficiently wider than mount 40 to expose teeth 70 radially outward beyond distal edge 62 of the mated mount.

As seen in FIG. 1, inner flute assemblies 26R-26L are positioned relative to outer flutes 24R-24L so that outer ends 66 of mounts 40 are generally aligned with inner ends 27 of the outer flutes.

It will be appreciated that the complementary right-sided flute elements and mounts are mirror images of the left-sided flute elements and mounts described above. The mounts 40 are positioned so that their inner and outer ends 66 and 64 are displaced with respect to one another circumferentially of the roll as seen, for example, in FIG. 1.

Where a component is referred to above, unless otherwise indicated, reference to that component (including a reference to "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof.

For example:

a. Though in the described example embodiments lugs 54A and 54B extend outward from base portion 42 of mount 40, in other embodiments, recesses may be formed in base portion 42 in place of lugs, and complementary lugs provided on flute element 30 in place of recesses 34A and 34B. Other complementary features between based portion 42 of mount 40 and plate body 31 of flute element 30 are also possible.

b. Though in the drawings flute element 30 is shown as extending traversely beyond mount 40, flute element 30 may be made thinner so as to be flush with mount 40, or thinner still, so as to be recessed relative to mount 40 when matingly engaged in seat 46.

c. Complementary pairs of mounts 40 may be joined at inner edges 66A, such as by a weld, or may be axially spaced apart as shown.

d. Mount 40 is illustrated as being made from a single piece, such as by machining or casting, such that base portion 42 is continuous with inner stop 57 and outer stop 58, and all of these elements are of a piece with backing portion 44. In other embodiments, base portion 42 may not be continuous with either or both of inner stop 57 and outer stop 58, and these elements may be separately formed and affixed to backing portion 44.

e. In the illustrated embodiment, base portion 42, inner stop 57 and outer stop 58 extend the full length, respectively of proximal edge 60, inner end 66, and outer end 64. In other embodiments base portion 42 may not extend the full length of proximal edge 60, inner stop 57 may not extend the full length of inner end 66, and outer stop 58 may not extend the full length of outer end 64.

FIGS. 9 to 16 show a feed roll assembly 9.1 and inner flute assembly 26L.1 according to another non-limiting embodiment. Like parts have like numbers and functions as feed roll assembly 9 and inner flute assemblies 26L-26R shown in FIGS. 1 to 8 with the addition of decimal extension ".1". Feed roll assembly 9.1 and inner flute assembly 26L.1 is substantially the same as feed roll assembly 9 and inner flute assembly 26L shown in FIGS. 1 to 8 with at least the following exceptions.

Figure 15:
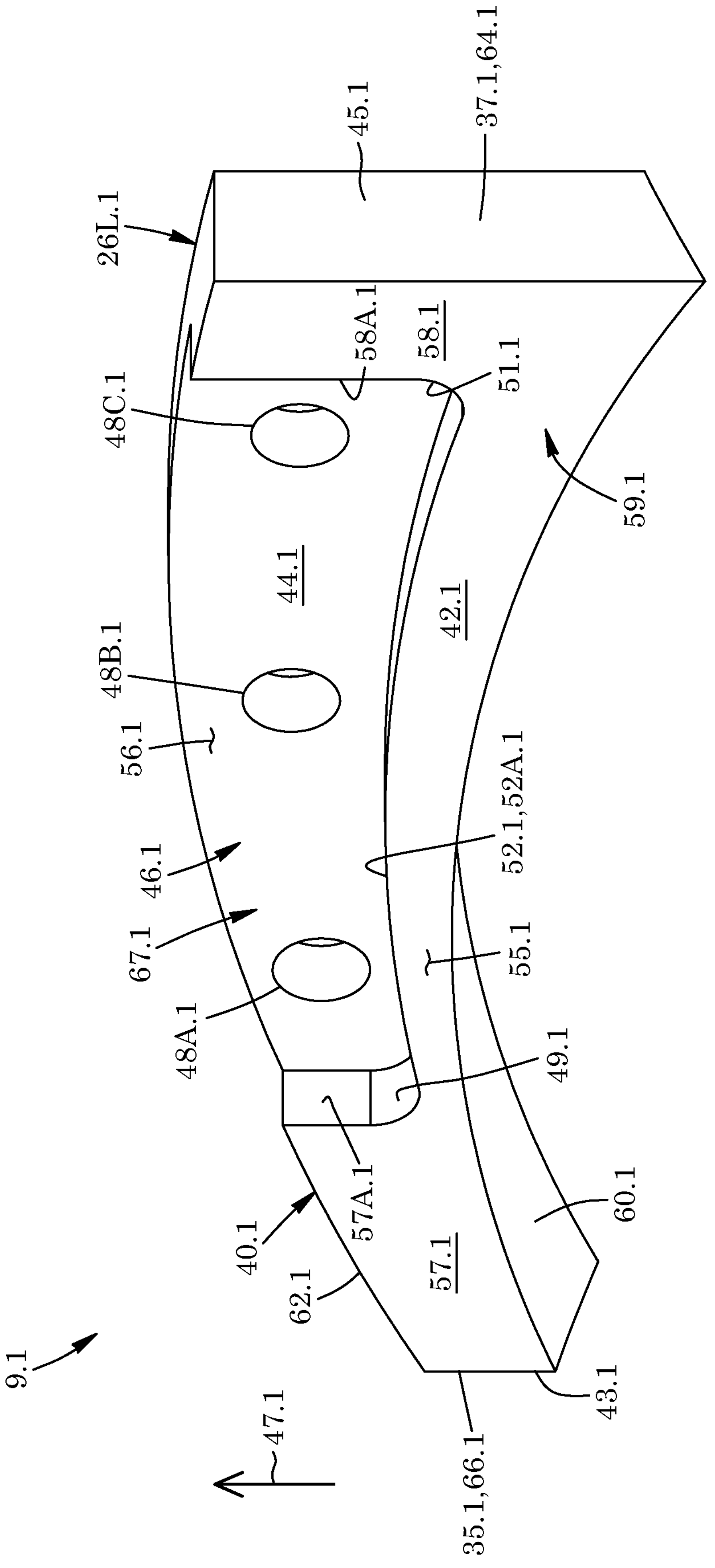
FIG. 15 is a front, first end perspective view of the mount of FIG. 10.

As seen in FIG. 15, outer face 52.1 of base portion 42.1 of mount 40.1 is continuous and smooth with no lugs extending therealong. The outer face of the base portion of the mount is generally planar and outwardly convex in this example. As seen in FIG. 15, seat 46.1 of mount 40.1 is L-shaped in lateral cross-section in this example.

Still referring to FIG. 15, the mount includes a first end portion, in this example stop 57.1 that extends substantially outwards in a first or radial direction 47.1 in this example. Mount 40.1 includes a second end portion, in this example stop 58.1 that extends substantially in a second, longitudinal or circumferential direction which is generally perpendicular to the radial direction in this example. However, this is not strictly required. The location and height of seat 46.1 may be adjusted based on the size of a given feed rolls 10.1 seen in FIG. 9. According to one non-limiting embodiment, insert in this example flute element 30.1 seen in FIG. 11 may have a fixed size (one-size-fits-all set of dimensions), with dimensions (e.g. lengths and widths) of mount 40.1 seen in FIG. 15 varying based on the size of the feed roll. In a further non-limiting embodiment, there may be provided a kit comprising one or more flute elements, together with a plurality of mounts with seats whose positioning varies.

Figure 14:
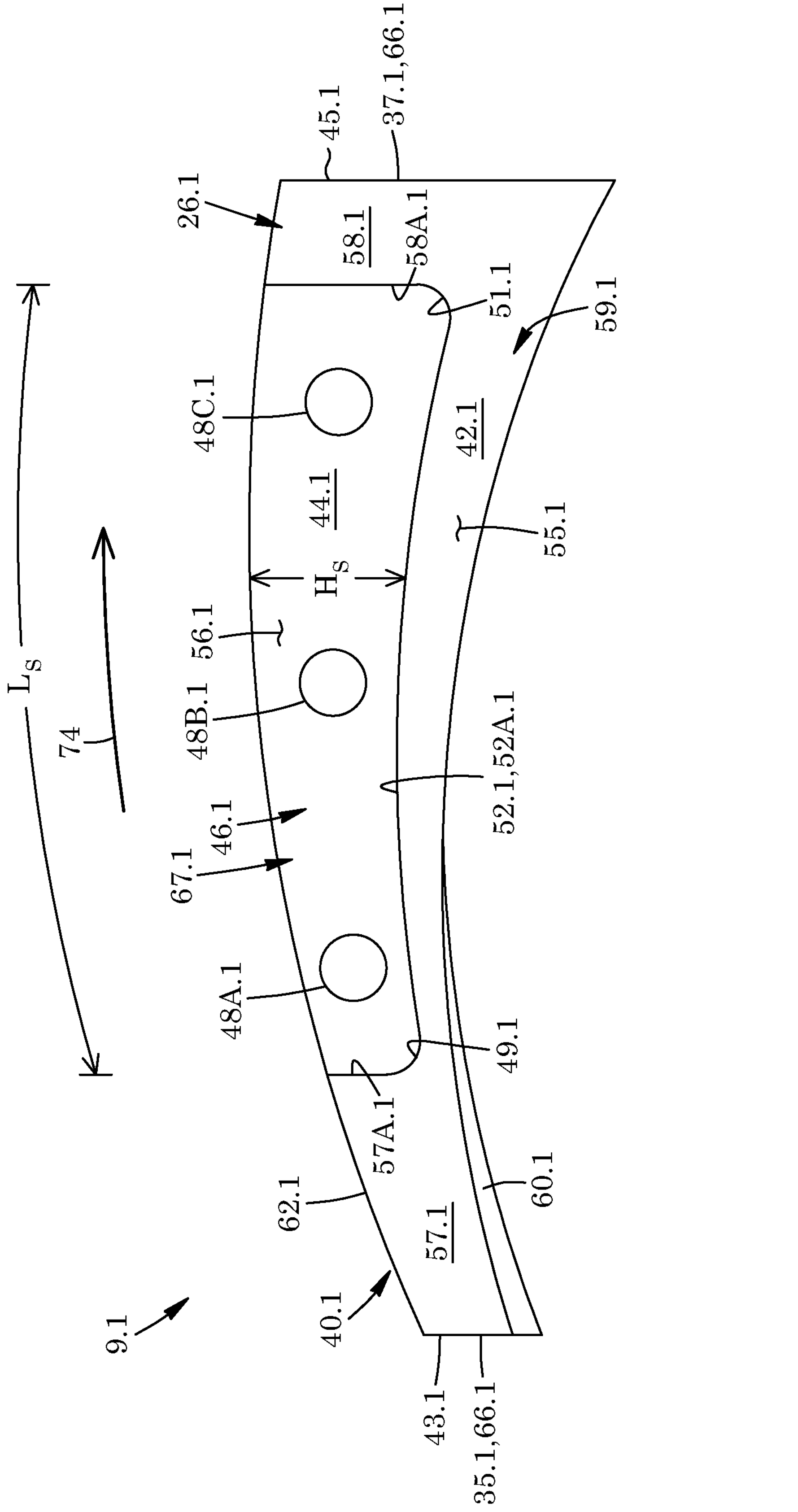
FIG. 14 is a front elevation view of the mount of FIG. 10.

In order to use flute element 30 of fixed size (seen in FIG. 11) for a variety of differently dimensioned feed rolls, the radius of curvature of proximal edge 60.1 of mount 40.1 seen in FIG. 14 may vary relative to that of outer face 52.1 of base portion 42.1 of the mount. In this non-limiting example, the proximal edge of the mount has a smaller radius of curvature and is more curved relative to the outer face of base portion of the mount. In order to use a flute element of fixed size for a variety of differently dimensioned feed rolls, the distance between proximal edge 60.1 of mount 40.1 and outer face 52.1 of base portion 42.1 of mount 40.1 may vary: in this example increasing in a direction 74 extending from end 43.1 to end 45.1 of the mount. In order to use flute element 30 (seen in FIG. 11) of fixed size for a variety of differently dimensioned feed rolls, positioning of boreholes 48 of mount 40.1 seen in FIG. 14 may vary: in this non-limiting example borehole 48A.1 of mount 40.1 is closer to distal edge 62.1 of the mount compared to borehole 48B.1, which in turn is closer to the distal edge of the mount compared to borehole 48C.1. Thus, one or more of borehole positioning of the mount, seat height Hs, seat length Ls, the curvature of proximal edge of the mount, and/or the curvature of outer face 52.1 of base portion 42.1 of the mount relative to the proximal edge of the mount, may vary as a function of one or more dimensions of a given feed roll 10.1 (seen in FIG. 9) to which the mount is adapted to couple.

Figure 16:
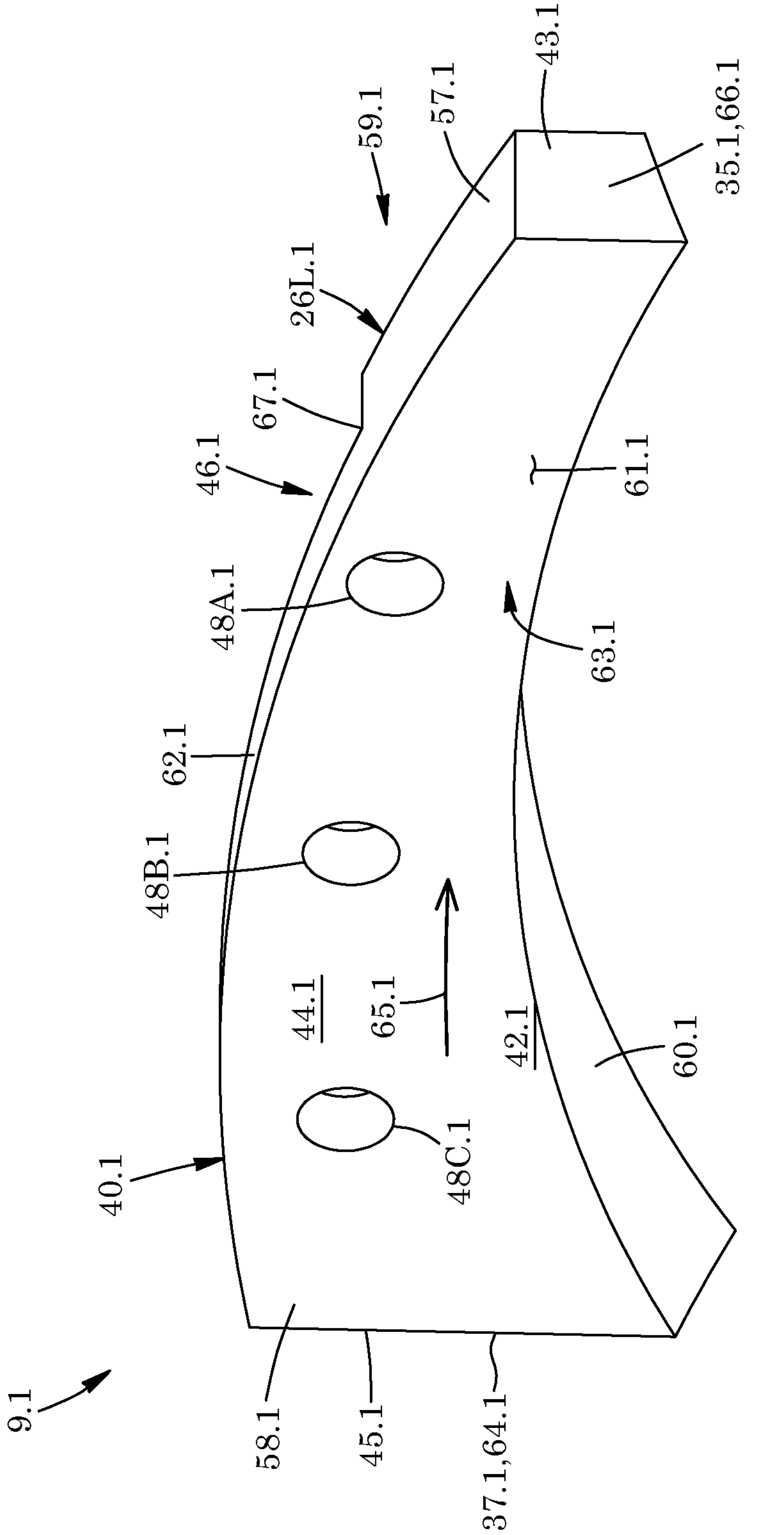
FIG. 16 is a rear, second end perspective view of the mount of FIG. 10.

As seen in FIG. 16, first, inner or proximal edge 60.1 of mount 40.1 faces both outwards in part and forwards in part. As seen in FIG. 16, second, outer or distal edge 62.1 of mount 40.1 extends about an axis that is angled relative to that of proximal edge 60.1 thereof. As seen in FIGS. 14 and 16, the proximal edge of the mount is twisted in part relative to the distal edge of the mount in this example. Proximal edge 60.1 of mount 40.1 so shaped/twisted may function to better promote fitting/abutting/extending-along of the mount on outer surface 13.1 of body 20.1 of feed roll 10.1 seen in FIG. 9. In this non-limiting embodiment, mount 40.1 so shaped is formed via casting.

Figure 12:
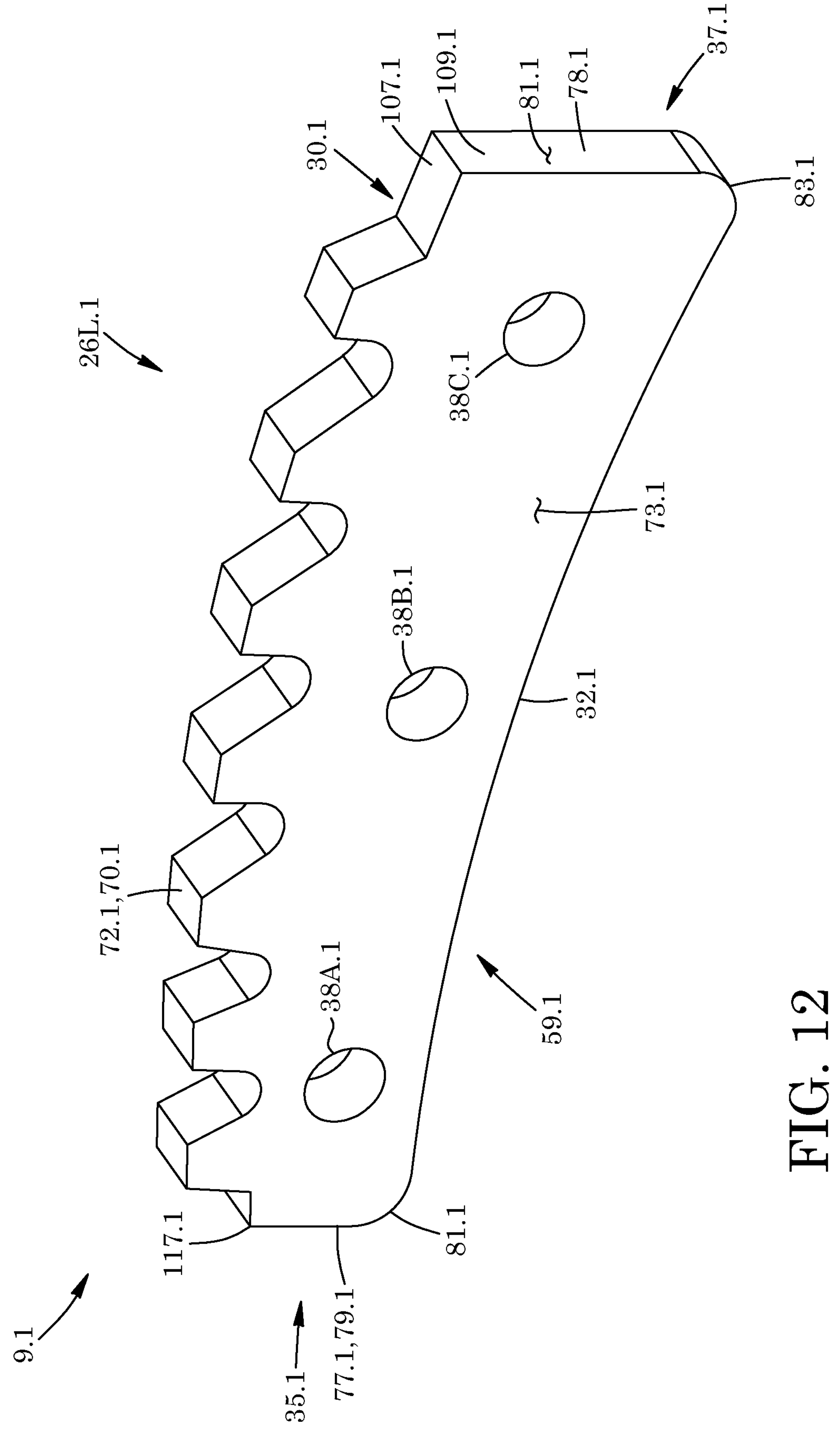
FIG. 12 is a front, first end perspective view of the flute element of FIG. 10.
Figure 13:
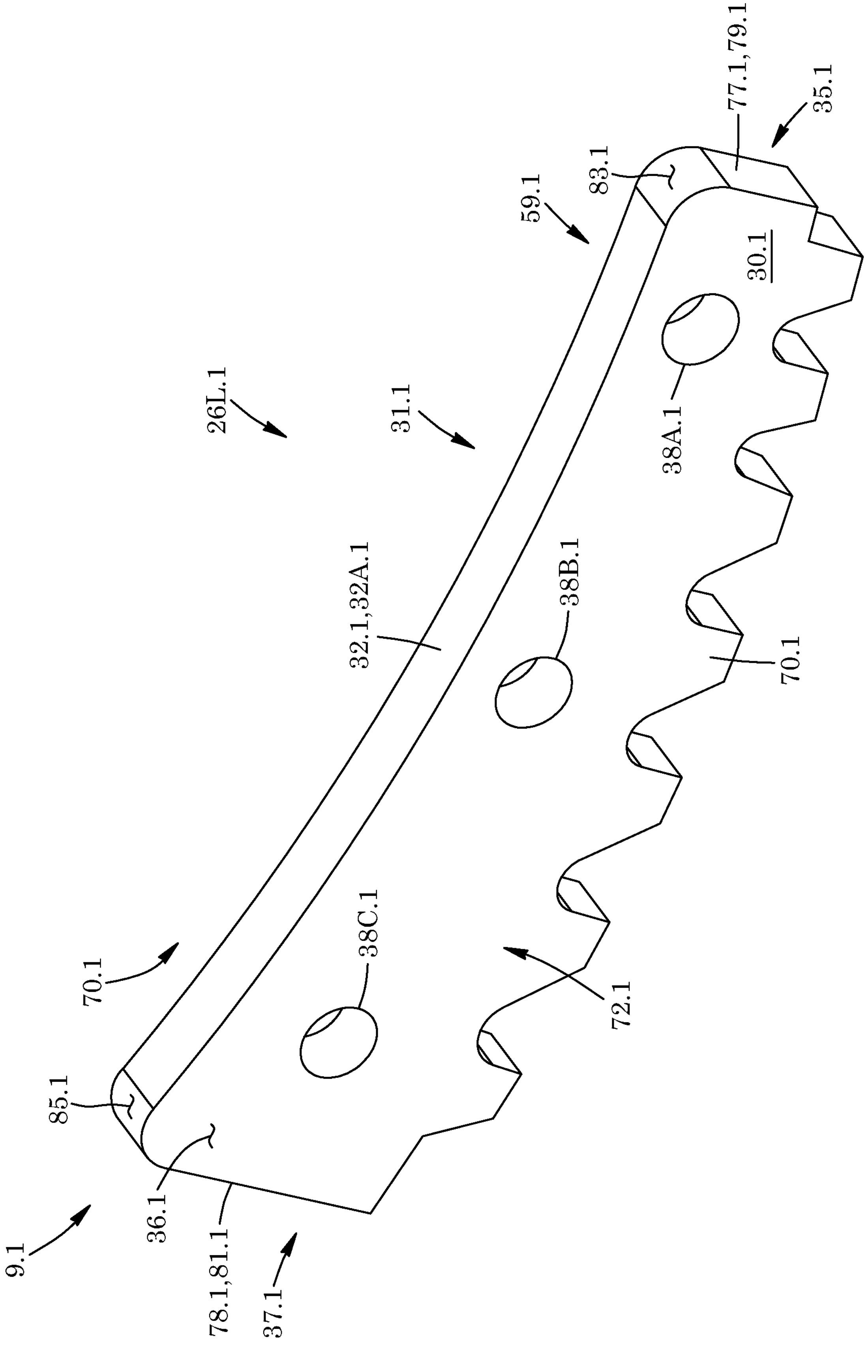
FIG. 13 is a rear, second end perspective view of the flute element of FIG. 10.

As seen in FIG. 12, flute element 30.1 includes gripping members, in this case in the form of a plurality of teeth 70.1, with each gripping member thus being tooth-shaped in this example. The teeth couple to and extend outwards from outer face 107.1 of the flute element 30.1. Teeth 70.1 are integrally connected to flute element 30.1 so as to form a unitary whole in this non-limiting embodiment.

Figure 9:
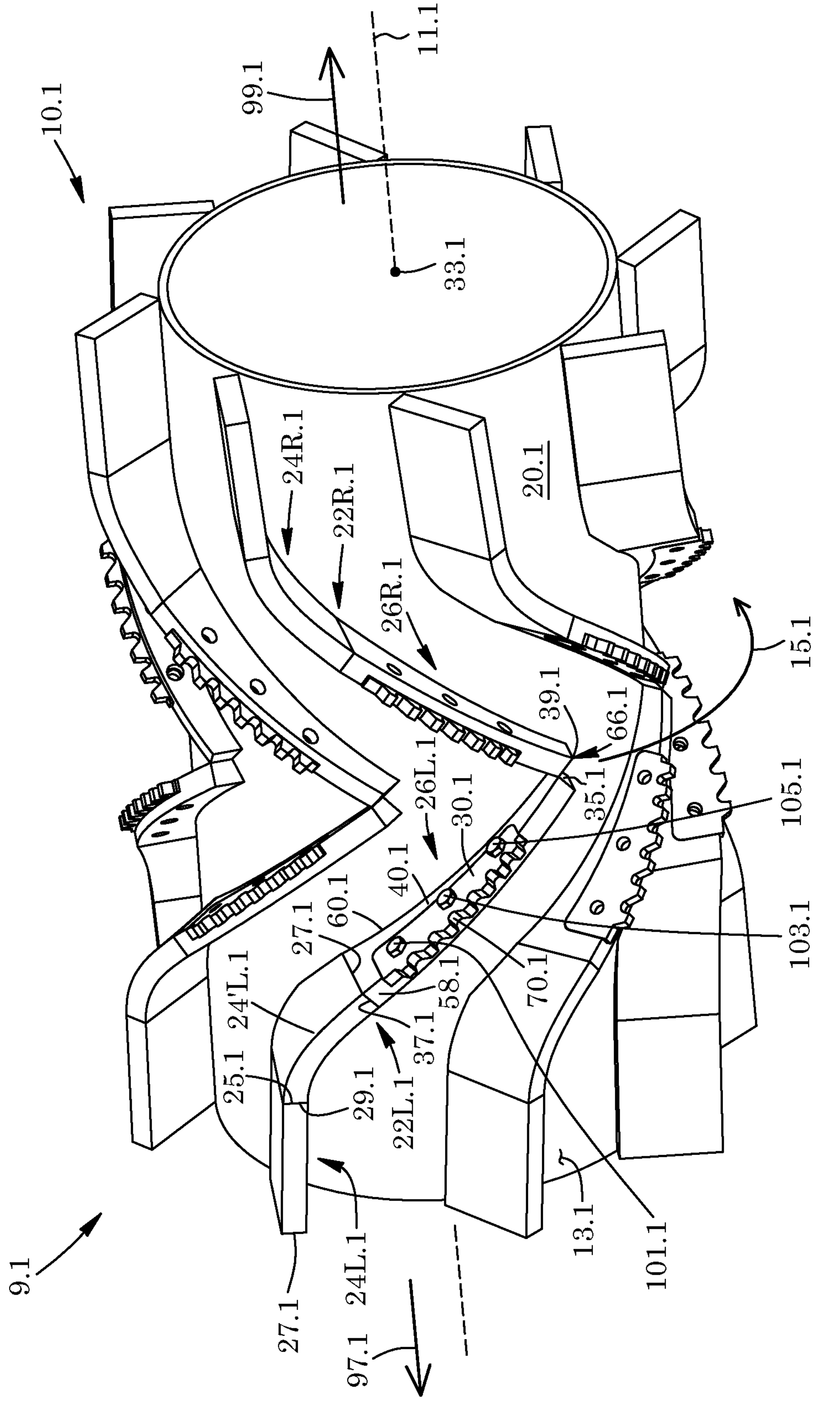
FIG. 9 is a front, first end perspective view of a feed roll assembly according to another non-limiting embodiment, the feed roll assembly including a feed roll and a plurality of flute assemblies completed thereto.
Figure 10:
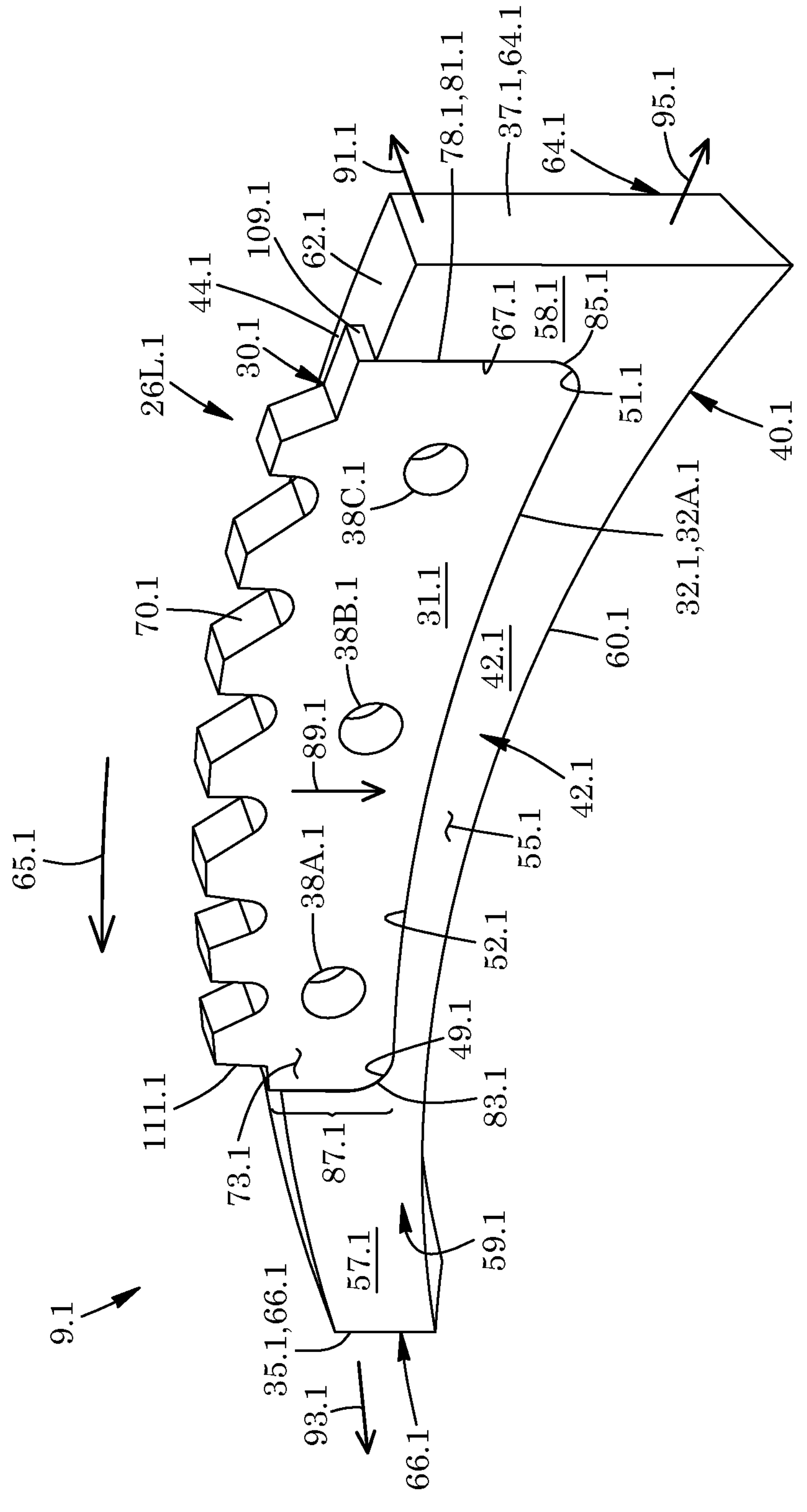
FIG. 10 is a front, first end perspective view of one of the flute assemblies of FIG. 9, the flute assembly includes a mount and flute element coupled to and partially received within the mount thereof.
Figure 11:
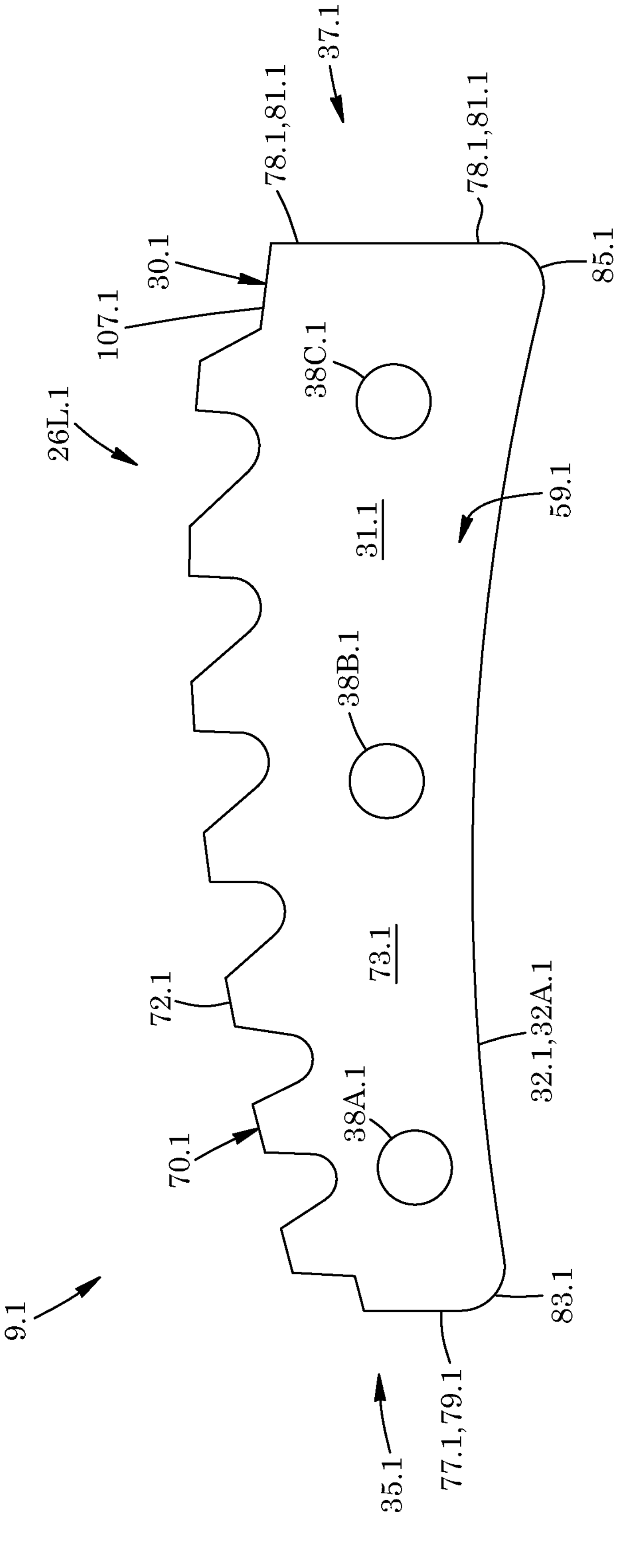
FIG. 11 is a front elevation view of the flute element of FIG. 10.

As seen in FIG. 9, the inner ends and edges 66.1 of mount 40.1 are planar and non-beveled in this example.

Figure 17:
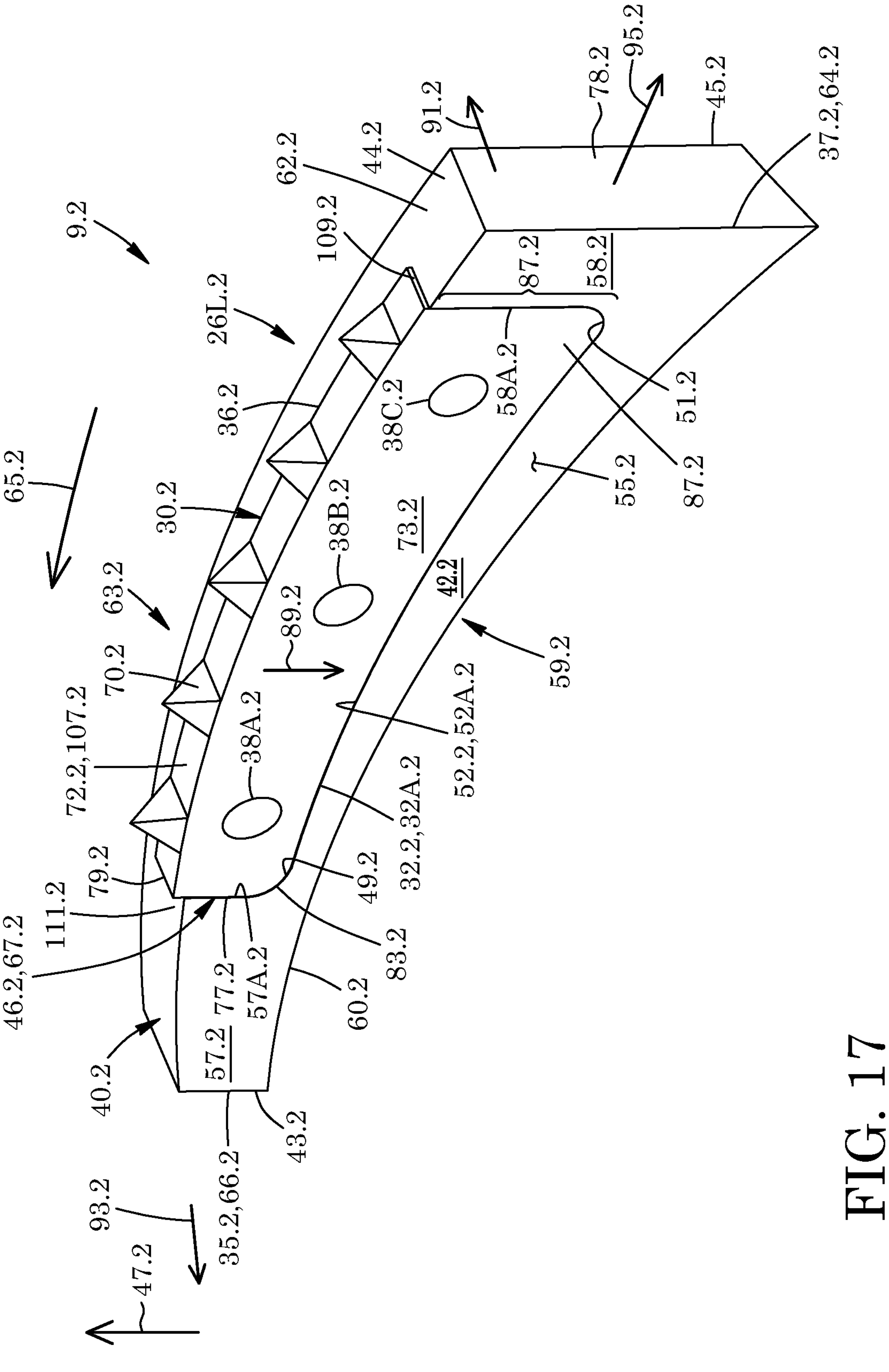
FIG. 17 is a front, first end perspective view of a flute assembly for a feed roll assembly according to a further non-limiting embodiment, the flute assembly including a mount and flute element coupled to and partially received within the mount thereof.

FIG. 17 shows an inner flute assembly 26L.2 of a feed roll assembly 9.2 according to an additional non-limiting embodiment. Like parts have like numbers and functions as inner flute assembly 26L.1 and feed roll assembly 9.1 shown in FIGS. 9 to 16 with decimal extension ".2" replacing decimal extension ".1" and being added for parts not previously having decimal extensions. Inner flute assembly 26L.2 of feed roll assembly 9.2 is substantially the same as inner flute assembly 26L.1 of feed roll assembly 9.1 shown in FIGS. 9 to 16 with at least the following exceptions.

Figure 18:
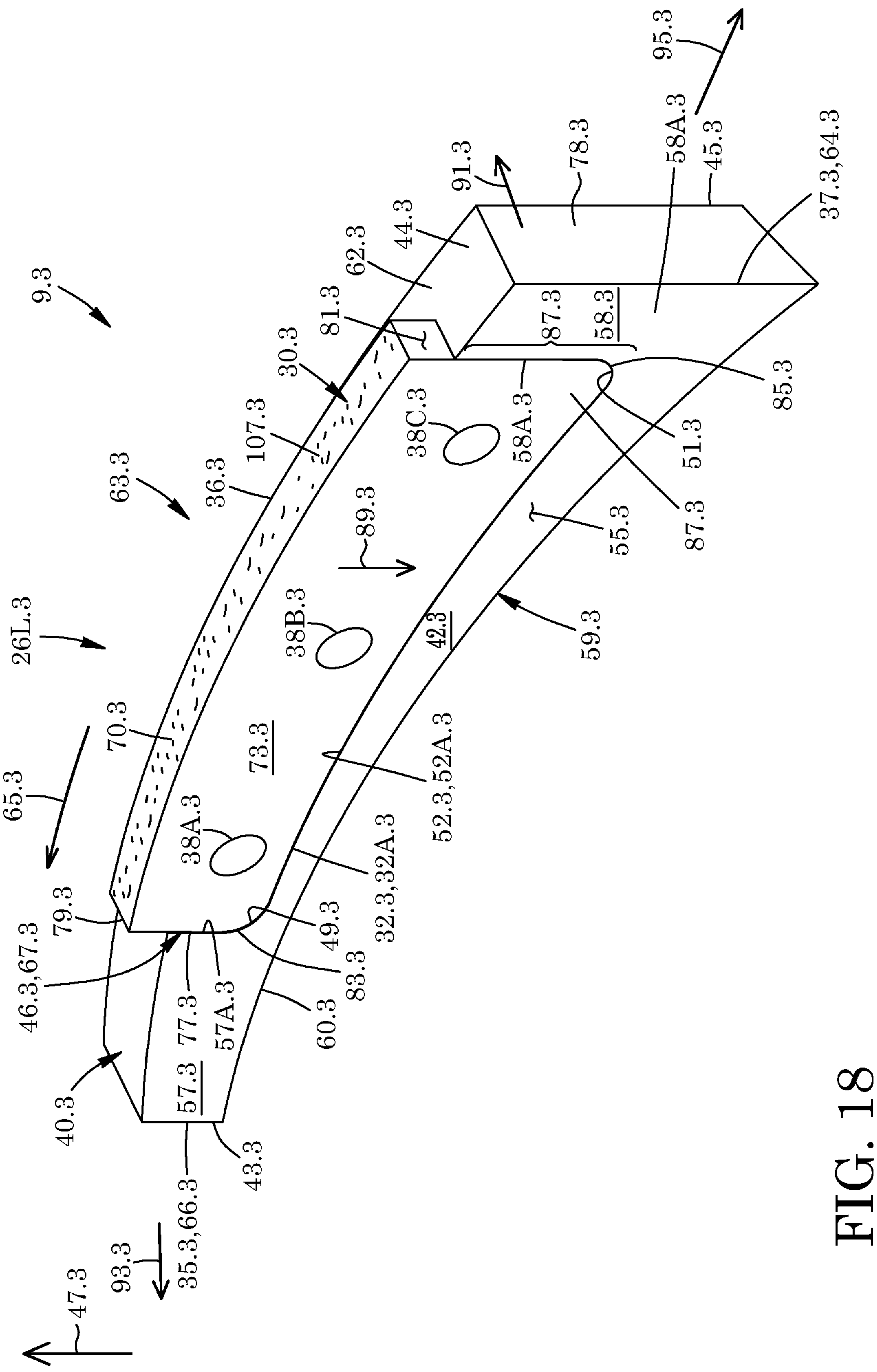
FIG. 18 is a front, first end perspective view of a flute assembly for a feed roll assembly according to a yet another non-limiting embodiment, the flute assembly including a mount and flute element coupled to and partially received within the mount thereof.

Gripping/traction members in this example teeth 70.2 are pyramid shaped. In other embodiments, traction elements may comprise conical spikes FIG. 18 shows an inner flute assembly 26L.3 of a feed roll assembly 9.3 according to a further non-limiting embodiment. Like parts have like numbers and functions as inner flute assembly 26L.1 and feed roll assembly 9.1 shown in FIGS. 9 to 16 with decimal extension ".3" replacing decimal extension ".1" and being added for parts not previously having decimal extensions. Inner flute assembly 26L.3 of feed roll assembly 9.3 is substantially the same as inner flute assembly 26L.1 of feed roll assembly 9.1 shown in FIGS. 9 to 16 with at least the following exceptions.

Outer face 107.3 of plate body 30.3 of flute element 30.3 is continuous in this example. The outer face of the plate body of the flute element is generally planar. Outer face 107.3 of plate body 30.3 of flute element 30.3 is outwardly convex. The curvature of the outer face of the flute element is less than that of inner face 32.3 of plate body 30.3 of flute element 30.3 in this example.

Inner flute assembly 26L.3 includes a plurality of gripping/traction members in this example in the form of portions of hardened material 70.3. This may comprise carbide hard facing for example, though this is not strictly required and other materials may be used in other embodiments. Hardened material 70.3 may be but need not be formed via crushing. The hardened material couples to and extends along outer face 107.3 of flute element 30.3.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. In combination, an elongate mount and an insert for a feed roll, the elongate mount coupling to and extending radially outwards from the feed roll, the elongate mount having a recessed region extending from a distal edge towards a proximal edge thereof, the recessed region of the elongate mount extending from a first face towards a second face thereof, the recessed region of the elongate mount extending between a pair of spaced-apart ends thereof, the recessed region of the elongate mount being u-shaped in longitudinal cross-section, the recessed region of the elongate mount being L-shaped in a lateral cross-section, the insert being shaped to matingly engage with the elongate mount via the recessed region of the elongate mount, and the insert having a backing face shaped to at least in part abut and extend along the elongate mount such that the backing face is positioned between the first face and the second face of the elongate mount.

2. The combination according to claim 1, wherein the insert includes a pair of spaced-apart ends shaped to extend along and abut corresponding interior end faces of the elongate mount.

3. The combination as claimed in claim 2, wherein the insert has a plurality of longitudinally spaced-apart boreholes extending therethrough and wherein the elongate mount has a plurality of longitudinally spaced-apart boreholes extending therethrough, the plurality of boreholes of the elongate mount being positioned to align with the plurality of boreholes of the elongate mount, and the plurality of boreholes of the elongate mount being positioned between the interior end faces of the elongate mount.

4. The combination according to claim 1, wherein the insert has a pair of spaced-apart end faces between which the backing face thereof extends, with the spaced-apart end faces of the insert extending perpendicular to the backing face of the insert.

5. The combination according to claim 1, wherein the insert has a proximal edge shaped to abut and extend along the elongate mount and which is outwardly concave.

6. The combination according to claim 1, wherein the insert has a pair of spaced-apart rounded corners shaped to matingly engage with the elongate mount.

7. The combination according to claim 1, wherein the elongate mount includes a first end portion which extends outwards in a first direction and wherein the elongate mount includes a second end portion which extends in a second direction which is angled relative to the first direction.

8. The combination as claimed in claim 1, wherein the proximal edge of the elongate mount is twisted in part relative to the distal edge of the elongate mount.

9. In combination, an elongate mount and an insert for a feed roll, the elongate mount coupling the insert to the feed roll, the elongate mount being shaped to enclose a proximal edge and spaced-apart ends of an inner portion of the insert and the elongate mount being shaped to fully enclose and cover a backing face of the inner portion of the insert via a recessed portion thereof, the recessed portion of the elongate mount being u-shaped in longitudinal cross-section and L-shaped in a lateral cross-section.

10. The combination according to claim 9, including a plurality of longitudinally spaced-apart gripping members coupled to and extending outwards from the insert.

11. The combination according to claim 9, including portions of or crushed hardened material coupled to an outer edge of the insert, wherein said hardened material has an inherent hardness greater than that of the insert.

12. The combination according to claim 9, wherein the insert has a pair of spaced-apart rounded corners, with each of said rounded corner extending between the proximal edge and a respective one of said spaced-apart ends of the insert.

13. The combination according to claim 9, wherein the proximal edge of the insert is outwardly concave and wherein the insert has an outer edge which is outwardly convex.

14. The combination as claimed in claim 9, wherein the recessed region of the elongate mount extends from a distal edge of the elongate mount towards a proximal edge of the elongate mount, with the proximal edge of the elongate mount being twisted in part relative to the distal edge of the elongate mount.

15. The combination as claimed in claim 9, wherein the elongate mount includes a first end portion which extends outwards in a first direction along a longitudinal axis thereof, wherein the elongate mount includes a second end portion spaced-apart from the first end portion thereof, the insert extending between the first and second end portions of the elongate mount, and the second end portion of the elongate mount extending in a second direction along a longitudinal axis which is angled relative to the first direction.

16. The combination as claimed in claim 15, wherein the insert has a plurality of longitudinally spaced-apart boreholes extending therethrough and wherein the elongate mount has a plurality of longitudinally spaced-apart boreholes extending therethrough, the plurality of boreholes of the elongate mount being positioned to align with the plurality of boreholes of the elongate mount, and the plurality of boreholes of the elongate mount being positioned between the first and second end portions of the elongate mount.

17. In combination, an elongate mount and an insert for a feed roll, the elongate mount coupling to and extending radially outwards from the feed roll, the elongate mount having a recessed region extending from a distal edge towards a proximal edge thereof, the recessed region of the elongate mount extending from a first face towards a second face thereof, the recessed region of the elongate mount extending between a pair of spaced-apart ends thereof, the recessed region of the elongate mount being u-shaped in longitudinal cross-section, the recessed region of the elongate mount being L-shaped in a lateral cross-section, the elongate mount including a first end portion which extends outwards in a first direction along a longitudinal axis thereof, the elongate mount including a second end portion spaced-apart from the first end portion thereof, the second end portion of the elongate mount extending in a second direction along a longitudinal axis which is angled relative to the first direction, the insert extending between the first and second end portions of the elongate mount and being shaped to matingly engage with the elongate mount via the recessed region of the elongate mount.

18. The combination as claimed in claim 17, wherein the proximal edge of the elongate mount is twisted in part relative to the distal edge of the elongate mount.

19. The combination as claimed in claim 17, wherein the insert has a plurality of longitudinally spaced-apart boreholes extending therethrough and wherein the elongate mount has a plurality of longitudinally spaced-apart boreholes extending therethrough, the plurality of boreholes of the elongate mount being positioned to align with the plurality of boreholes of the elongate mount, and the plurality of boreholes of the elongate mount being positioned between the first and second end portions of the elongate mount.

20. In combination, an elongate mount and a feed roll, the elongate mount being shaped to enclose a proximal edge and spaced-apart ends of an inner portion of a insert and the elongate mount being shaped to fully enclose and cover a backing face of the inner portion of the insert via a recessed portion thereof, the recessed portion of the elongate mount being u-shaped in longitudinal cross-section and L-shaped in a lateral cross-section; wherein the elongate mount is configured to couple the insert to the feed roll.

* * * * *